(12) United States Patent
Rivelli et al.

(10) Patent No.: US 11,394,678 B2
(45) Date of Patent: Jul. 19, 2022

(54) TECHNOLOGY FOR MANAGING THE TRANSMISSION OF DESIGNATED ELECTRONIC COMMUNICATIONS

(71) Applicant: SECURE PRIVILEGE, LLC, Willowbrook, IL (US)

(72) Inventors: Timothy Rivelli, Willowbrook, IL (US); Stephen Kunath, Fairfax, VA (US)

(73) Assignee: SECURE PRIVILEGE, LLC, Willowbrook, IL (US)

( * ) Notice: Subject to any disclaimer, the term of this patent is extended or adjusted under 35 U.S.C. 154(b) by 492 days.

(21) Appl. No.: 15/487,582

(22) Filed: Apr. 14, 2017

(65) Prior Publication Data
US 2017/0302606 A1    Oct. 19, 2017

Related U.S. Application Data

(60) Provisional application No. 62/322,609, filed on Apr. 14, 2016.

(51) Int. Cl.
*G06F 15/16* (2006.01)
*H04L 51/00* (2022.01)
(Continued)

(52) U.S. Cl.
CPC ............ *H04L 51/14* (2013.01); *G06Q 10/10* (2013.01); *G06Q 50/18* (2013.01); *H04L 51/063* (2013.01);
(Continued)

(58) Field of Classification Search
CPC ......... H04L 51/14; H04L 51/10; H04L 51/12; H04L 51/24; H04L 51/34; H04L 63/08; G06Q 10/10; G06Q 50/18
See application file for complete search history.

(56) References Cited

U.S. PATENT DOCUMENTS

| 7,392,289 B2 | 6/2008 | Curry et al. |
| 7,493,359 B2 | 2/2009 | Fitzpatrick et al. |

(Continued)

FOREIGN PATENT DOCUMENTS

| AU | 2006335151 A1 * | 8/2008 | ............ G06F 16/00 |
| JP | 3905489 B2 * | 4/2007 | ............ G06F 21/00 |

(Continued)

OTHER PUBLICATIONS

International Search Report and Written Opinion, International Application No. PCT/US2017/027532, dated Aug. 4, 2017.

(Continued)

*Primary Examiner* — Khanh Q Dinh
*Assistant Examiner* — Clarence D McCray
(74) *Attorney, Agent, or Firm* — Marshall, Gerstein & Borun LLP; Randall G. Rueth

(57) ABSTRACT

Systems and methods for managing and storing electronic communications are disclosed. According to certain aspects, the systems and methods may receive an electronic communication specifying a set of recipient users, where at least one of the recipient users is not registered to receive the electronic communication. The systems and methods may receive approval from a sending client to send the electronic communication to the unregistered user, and may send the electronic communication to the unregistered user and store the electronic communication appropriately for later analysis and retrieval.

17 Claims, 26 Drawing Sheets

(51) Int. Cl.

| | |
|---|---|
| *G06Q 10/10* | (2012.01) |
| *G06Q 50/18* | (2012.01) |
| *H04L 51/18* | (2022.01) |
| *H04L 51/224* | (2022.01) |
| *H04L 51/234* | (2022.01) |
| *H04L 51/063* | (2022.01) |
| *H04L 51/10* | (2022.01) |
| *H04L 9/40* | (2022.01) |
| *H04L 67/50* | (2022.01) |
| *H04L 67/01* | (2022.01) |

(52) U.S. Cl.
CPC .............. *H04L 51/10* (2013.01); *H04L 51/12* (2013.01); *H04L 51/18* (2013.01); *H04L 51/24* (2013.01); *H04L 51/34* (2013.01); *H04L 63/08* (2013.01); *H04L 63/10* (2013.01); *H04L 67/22* (2013.01); *H04L 67/42* (2013.01)

(56) References Cited

U.S. PATENT DOCUMENTS

| | | | |
|---|---|---|---|
| 7,853,885 B2 | 12/2010 | Ramcharran et al. | |
| 8,126,969 B1* | 2/2012 | Hall | G06Q 10/10 709/206 |
| 8,359,355 B2 | 1/2013 | O'Sullivan et al. | |
| 8,448,246 B2 | 5/2013 | Guerrero et al. | |
| 8,458,269 B2 | 6/2013 | Friedman et al. | |
| 8,694,490 B2 | 4/2014 | Mandel et al. | |
| 8,738,721 B1 | 5/2014 | Smirnov et al. | |
| 8,775,455 B2 | 7/2014 | Kanamori | |
| 8,843,567 B2 | 9/2014 | Karnik | |
| 9,076,008 B1 | 7/2015 | Moy | |
| 9,081,981 B2 | 7/2015 | Lim | |
| 9,092,434 B2 | 7/2015 | Kumar et al. | |
| 2003/0236847 A1* | 12/2003 | Benowitz | H04L 51/12 709/206 |
| 2004/0083296 A1* | 4/2004 | Metral | H04L 63/08 709/225 |
| 2005/0004951 A1 | 1/2005 | Ciaramitaro et al. | |
| 2005/0188041 A1 | 8/2005 | Kuriki et al. | |
| 2005/0198173 A1* | 9/2005 | Evans | H04L 51/12 709/206 |
| 2006/0212303 A1 | 9/2006 | James et al. | |
| 2007/0016613 A1 | 1/2007 | Foresti et al. | |
| 2007/0226300 A1* | 9/2007 | Smith | H04L 51/30 709/206 |
| 2008/0060051 A1 | 3/2008 | Lim | |
| 2008/0133667 A1 | 6/2008 | Raguseo et al. | |
| 2008/0140650 A1* | 6/2008 | Stackpole | H04L 67/18 707/999.005 |
| 2008/0235112 A1 | 9/2008 | Montoya | |
| 2009/0198995 A1* | 8/2009 | Finlay | H04L 51/00 713/153 |
| 2009/0241197 A1 | 9/2009 | Troyansky | |
| 2009/0254972 A1 | 10/2009 | Huang et al. | |
| 2009/0265311 A1 | 10/2009 | Chavez et al. | |
| 2009/0313348 A1* | 12/2009 | Plestid | H04M 1/72436 709/217 |
| 2010/0011448 A1 | 1/2010 | Wagner | |
| 2010/0030798 A1 | 2/2010 | Kumar et al. | |
| 2010/0162388 A1 | 6/2010 | Baugher et al. | |
| 2011/0307408 A1 | 12/2011 | Gates | |
| 2012/0011361 A1* | 1/2012 | Guerrero | G06Q 10/107 713/168 |
| 2012/0158728 A1 | 6/2012 | Kumar et al. | |
| 2012/0331069 A1 | 12/2012 | Wieneke et al. | |
| 2013/0166657 A1* | 6/2013 | Tadayon | G06Q 10/107 709/206 |
| 2013/0283398 A1 | 10/2013 | Wu | |
| 2014/0033051 A1* | 1/2014 | Nihal | G06F 3/0484 715/733 |
| 2014/0344369 A1 | 11/2014 | Goldberg et al. | |
| 2014/0379598 A1 | 12/2014 | Perrone et al. | |
| 2015/0007346 A1 | 1/2015 | Delia et al. | |
| 2015/0256679 A1* | 9/2015 | Burnett | H04L 51/14 379/88.12 |
| 2015/0304261 A1 | 10/2015 | Menna et al. | |
| 2015/0312198 A1 | 10/2015 | Lazaridis | |
| 2016/0019503 A1 | 1/2016 | Katz | |
| 2016/0277332 A1 | 9/2016 | Luman et al. | |
| 2017/0302604 A1 | 10/2017 | Rivelli et al. | |
| 2017/0302671 A1 | 10/2017 | Rivelli et al. | |
| 2018/0144359 A1 | 5/2018 | Mello et al. | |
| 2019/0075070 A1 | 3/2019 | Farrell et al. | |

FOREIGN PATENT DOCUMENTS

| | | | | |
|---|---|---|---|---|
| WO | WO-2000046952 A1 | | 8/2000 | |
| WO | WO-2010151873 A1 * | | 12/2010 | ......... H04L 12/5885 |
| WO | WO-2013122630 A1 | | 8/2013 | |

OTHER PUBLICATIONS

European Patent Application No. 17733093.3, Communication Pursuant to Article 94(3) EPC, dated Feb. 5, 2020.

\* cited by examiner

TECHNOLOGY FOR MANAGING THE TRANSMISSION OF DESIGNATED ELECTRONIC COMMUNICATIONS

CROSS-REFERENCE TO RELATED APPLICATIONS

This application claims priority benefit of U.S. Provisional Application No. 62/322,609, filed Apr. 14, 2016, the disclosure of which is incorporated herein by reference in its entirety.

FIELD

The present disclosure is directed to managing electronic communications. More particularly, the present disclosure is directed to systems and methods for enabling users to classify electronic communications with certain designations, and managing the transmission and access of the designated electronic communications.

BACKGROUND

The ability for people to send each other electronic communications, such as emails, has changed the ways that people conduct business and carry out other activities. As an example, employees or individuals associated with companies frequently send emails as a way to plan and schedule meetings, plan and discuss projects, and provide thoughts and feedback, among many other uses. Often, electronic communications are sent between and among individuals distributed across multiple companies, organizations, or entities.

In the legal field, as an example, the attorney-client privilege exists to encourage full communication between attorneys and their clients, thus enabling attorneys to provide sound and informed legal advice. These privileged communications are created and must be preserved in a confidential manner. In the instance of a litigation, communications that are under the attorney-client privilege need to be located, segregated, and/or identified as privileged. Accordingly, this process should protect the privileged information from being reviewed by the opposing side in litigation. However, the attorney-client privilege may sometimes be unintentionally waived or broken in certain circumstances, such as if a communication is made public or availed to a third party, or in other circumstances.

Accordingly, there is an opportunity for systems and methods to efficiently and properly enable individuals to classify electronic communications with certain designations, and manage the access, transmission, and storage of the designated electronic communications.

SUMMARY

In an embodiment, a computer-implemented method in an electronic device of managing electronic communications is provided. The method may include: receiving, from a sending client, an electronic communication (i) originated by a sending user, (ii) specifying a set of recipient users, and (iii) having a designation; determining, by a computer processor, that at least one of the set of recipient users is not registered to receive electronic communications having the designation; sending, to the sending client, a notification that the at least one of the set of recipient users is not registered to receive electronic communications having the designation; receiving, from the sending client, an approval to send the electronic communication to the at least one of the set of recipient users; sending the electronic communication to the at least one of the set of recipient users; and storing the electronic communication in memory to reflect the designation.

In another embodiment, a system for managing electronic communications is provided. The system may include a transceiver configured to communicate via at least one network connection, a memory configured to store non-transitory computer executable instructions, and a processor configured to interface with the transceiver and the memory. The processor may be configured to execute the non-transitory computer executable instructions to cause the processor to: receive, from a sending client via the transceiver, an electronic communication (i) originated by a sending user, (ii) specifying a set of recipient users, and (iii) having a designation, determine that at least one of the set of recipient users is not registered to receive electronic communications having the designation, send, to the sending client via the transceiver, a notification that the at least one of the set of recipient users is not registered to receive electronic communications having the designation, receive, from the sending client via the transceiver, an approval to send the electronic communication to the at least one of the set of recipient users, send, via the transceiver, the electronic communication to the at least one of the set of recipient users, and store the electronic communication in memory to reflect the designation.

In another embodiment, a non-transitory computer-readable medium is provided. The non-transitory computer-readable medium may include a plurality of instructions which, when executed by one or more processors, cause the one or more processors to: receive, from a sending client, an electronic communication (i) originated by a sending user, (ii) specifying a set of recipient users, and (iii) having a designation, determine that at least one of the set of recipient users is not registered to receive electronic communications having the designation, send, to the sending client, a notification that the at least one of the set of recipient users is not registered to receive electronic communications having the designation, receive, from the sending client, an approval to send the electronic communication to the at least one of the set of recipient users, send the electronic communication to the at least one of the set of recipient users, and store the electronic communication in memory to reflect the designation.

BRIEF DESCRIPTION OF THE FIGURES

FIGS. 12A-K depict additional exemplary user interfaces associated with managing electronic communications, in accordance with some embodiments.

DETAILED DESCRIPTION

Figure 1:
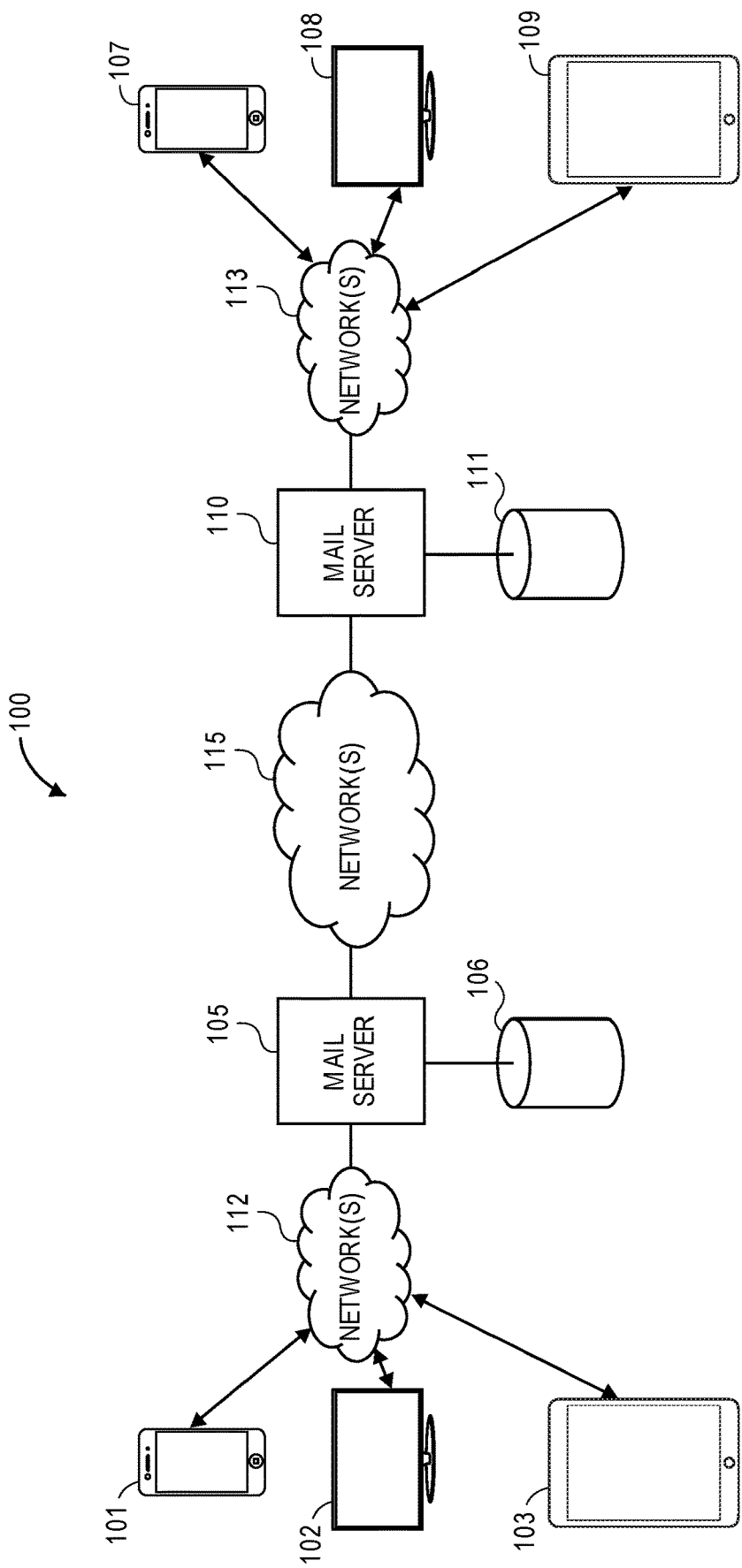
FIG. 1 depicts an overview of an exemplary system configured to support electronic communications, in accordance with some embodiments.

The present embodiments may relate to, inter alia, effectively and efficiently managing electronic communications that have a certain designation. According to certain aspects, the systems and methods may enable users to classify or assign certain electronic communications (e.g., emails) with a designation or classification (e.g., "privileged") prior to or after sending the electronic communications to a set of recipients. The systems and methods may appropriately store the electronic communications so that they are separate from "normal" or undesignated electronic communications. In this regard, the electronic communications may be easily logged and/or retrieved if needed.

According to the present embodiments, users may register with a system that enables the users to send and receive electronic communications that are classified with a certain designation. Further, a registered user is able to classify, with a designation, electronic communications that were previously not classified with a designation, or modify the designation of a previously-classified electronic communication. According to certain aspects, systems and methods may manage the transmission of the electronic communications according to certain rules associated with the user registrations and/or whether the participating users are internal or external to a central server (e.g., an email server). Further, the systems and methods may generate and maintain logs and records indicative of the transmission of the electronic communications. Moreover, the systems and methods may store or maintain the electronic communications according to their designations, thus enabling effective retrieval of electronic communications having certain designations. For example, the systems and methods may effectively retrieve all emails that are not designated as "privileged," such as in response to an information discovery request.

The systems and methods therefore offer numerous benefits. In particular, the systems and methods enable users to easily and effectively classify certain electronic communications with certain designations, such that the users need not be concerned with manually adding or including an indication of the designation to the electronic communication itself. Further, the systems and methods enable users to classify certain electronic communications with certain designations either before or after the electronic communications have been sent. Additionally, the systems and methods effectively log transmissions of the electronic communications and store the electronic communications according to their designations (or absence of designations), thus enabling easy and effective retrieval. It should be appreciated that other benefits are envisioned.

The systems and methods discussed herein address a business challenge, namely a business challenge related to inefficiencies in classifying and maintaining designations for electronic communications. This is particularly apparent when an entity is required to produce certain electronic communications. In conventional systems, electronic communications often include text, by default, that may indicate a certain confidential designation; however, such blanket designations result in instances in which electronic communications may be over- or improperly-designated, which may risk waiver depending on which users send and/or receive the electronic communications, among other factors. In contrast, the systems and methods utilize multiple computing components to enable users to classify electronic communications, and segment or store the electronic communications appropriately.

Therefore, the systems and methods do not merely recite the performance of some business practice known from the pre-Internet world (classifying electronic communications) along with the requirement to perform it on the Internet. Instead, the systems and methods are necessarily rooted in computer technology in order to overcome a problem specifically arising in electronic communication management and storage.

Further, it should be appreciated that the systems and methods may include specialized (i.e., non-generic) or dedicated components capable of performing specialized (i.e., non-generic) or dedicated computer functions. In particular, the systems and methods employ various components that are specifically configured to manage the transmission, access, logging, and storing of electronic communications.

Although the present embodiments describe specific types of electronic communications such as emails, it should be appreciated that other types of electronic communications are envisioned. For example, the electronic communications may also include any combination of text messages (e.g., SMS), voice-to-text messages, audio messages, videos, scanned documents, electronic notes, website data, hyperlinks, and/or any other data or media capable of being communicated via computer networks.

Similarly, although the present embodiments describe electronic communications having a designation of "privileged," it should be appreciated that other types of designations or classifications are envisioned. For example, the electronic communications may be classified as "confidential," "attorney work product," "proprietary," "compliance confidential," or any other recognized or unrecognized designation.

Further, although the present embodiments describe electronic communications in the context of the legal field, it should be appreciated that the systems and methods may apply to or implemented in other fields, industries, applications, and the like. For example, the systems and methods may be implemented in regulatory compliance areas, cybersecurity, finance industries, medical industries, human resources, consulting, and/or others.

FIG. 1 depicts a system 100 including various components associated with managing and storing electronic communications. It should be appreciated that the system 100 is merely exemplary and that alternative or additional components are envisioned.

The system 100 includes a set of client devices 101, 102, 103 that may each be any type of electronic device such as a mobile device (e.g., a smartphone), notebook or desktop computer, tablet, phablet, GPS (Global Positioning System)

or GPS-enabled device, smart watch, smart glasses, smart bracelet, wearable electronic, PDA (personal digital assistants), pager, computing device configured for wireless communication, and/or the like. Although FIG. 1 illustrates three (3) client devices 101, 102, 103, it should be appreciated that other amounts and types of client devices are envisioned.

The system 100 may further include a mail server 105 that may be configured to communicate with the client devices 101, 102, 103 via one or more networks 112. In certain embodiments, the network(s) 112 may be any internal network (e.g., any wired or wireless local area network (LAN), or others) or external network that may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). It should be appreciated that the mail server 105 may be any type of server including a combination of hardware and software components configured to facilitate the described functionalities. In particular, the mail server 105 may support the execution of various applications configured to facilitate the described functionalities. The mail server 105 may be configured to interface with or support a memory or database 106 capable of storing various data. For example, the database 106 may store electronic communications and logs or records associated with the electronic communications.

The mail server 105 may communicate with another mail server 110 via one or more networks 115. In certain embodiments, the network(s) 115 may be any network that may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Similar to the mail server 105, the mail server 110 may also be configured to interface with or support a memory or database 111 capable of storing various data. Each of the databases 106, 111 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

As illustrated in FIG. 1, the mail server 110 may also be configured to communicate with a set of client devices 107, 108, 109 via one or more networks 113. In certain embodiments, the network(s) 113 may be any internal network (e.g., any wired or wireless local area network (LAN), or others) or external network that may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Each of the client devices 107, 108, 109 may be any type of electronic device such as a mobile device (e.g., a smartphone), notebook or desktop computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. Although FIG. 1 illustrates three (3) client devices 107, 108, 109, it should be appreciated that other amounts and types of client devices are envisioned.

Because the system 100 manages communication of electronic communications, it should be appreciated that respective users of the client devices 101, 102, 103, 107, 108, and 109 may send each other electronic communications such as emails. The respective users may use the client devices 101, 102, 103, 107, 108, and 109 to access an account, application, communication platform, or the like, to access, view, interact with (e.g., respond to, forward) any received electronic communications. Effectively, the respective users of the client devices 101, 102, 103, 107, 108, 109 may use the devices to access electronic communications that are respectively hosted or stored on the mail servers 105, 110. For example, a user may use the client device 101 to access an email application that is configured with an email account of the user (i.e., the email application communicates with the mail server 105 to retrieve (e.g., push or pull) any new emails to the user or send any emails from the user).

For purposes of explanation, it should be assumed that one user of a respective client device 101, 102, 103 (i.e., a sending client) may initiate an electronic communication to be sent to one or more of the other client devices 101, 102, 103, 107, 108, 109 (i.e., recipient client(s)). Accordingly, the electronic communication may be an "internal" communication (e.g., if the client device 101 sends an electronic communication to the client device 102) and/or may be an "external" communication (e.g., if the client device 103 sends an electronic communication to the client device 107).

In operation, respective users of any of the client devices 101, 102, 103 may use the client devices 101, 102, 103 to compose an electronic communication (e.g., an email) that may indicate a set of recipients (e.g., one or more users of any of the other client devices 101, 102, 103, 107, 108, 109). According to embodiments, the mail server 105 may manage the delivery of electronic communications to one or more of the client devices 101, 102, 103, and the mail server 110 (via the mail server 105 and the network(s) 115) may manage the delivery of the electronic communications to one or more of the client devices 107, 108, 109.

As an example, assume that a user of the client device 102 composes an email indicating the set of recipients as a user of the client device 101 and a user of the client device 108. The client device 102 may send the email to the mail server 105 via the network(s) 112. Because the email specifies the user of the client device 101 as one of the recipients (i.e., an internal user), the mail server 105 may transmit the email to the client device 101 via the network(s) 112 (or the client device 101 may retrieve the email from the mail server 105 via the network(s) 112). Accordingly, the user of the client device 101 may use the client device 101 to access and view the email.

Further, because the email specifies the user of the client device 108 as another of the recipients (i.e., an external user), the mail server 105 may send the email to the other mail server 110 via the network(s) 115. The mail server 110 may examine the email and identify the recipient (i.e., the user of the client device 108), and may accordingly transmit the email to the client device 108 via the network(s) 113 (or the client device 108 may retrieve the email from the mail server 110 via the network(s) 113). Accordingly, the user of the client device 108 may use the client device 108 to access and view the email.

According to the present embodiments, the mail server 105 may manage the communication and storage of electronic communications that are classified with certain designations. The mail server 105 may, accordingly, enable users to register to be able to send and/or receive electronic communications having certain designations. If a user is registered with the mail server 105, then the user may be considered to be authorized for certain electronic communication designations according to the registration. Conversely, if a user is not registered with the mail server 105, then the user may not be considered to be authorized for certain electronic communication designations.

In some implementations, the mail server 105 may automatically register or authorize certain users within an organization. For example, if a law firm wishes to implement the systems and methods, the mail server 105 may automatically identify the attorneys of the law firm and may register or authorize the attorneys for communicating with certain designations (and may not register or authorize non-attorneys of the law firm).

In some scenarios, an electronic communication may be classified with a certain designation (e.g., by a user of a sending device) prior to the electronic communication being sent. In this scenario, the mail server 105 may examine the electronic communication to identify the designation, and may transmit and/or store the electronic communication in the database 106 accordingly. Further, the email server 105 may communicate with the user of the sending device for approval to transmit certain electronic communications, such as if an electronic communication is intended for a user who is not authorized or registered to receive electronic communications having a certain designation.

In other scenarios, the electronic communications may be classified with a certain designation after the electronic communication is sent to the recipient users. In this scenario, the mail server 105 may retrieve the electronic communication and/or information relating thereto from the database 106 (e.g., a log of the electronic communication), modify or change the designation of the electronic communication, notify certain users of the change in designation, store the electronic communication in the database 106 according to the designation, and/or facilitate other functionalities.

Although the present embodiments describe a user able to classify an electronic communication with a single designation, it should be appreciated that the user may select the designation from multiple options, where each option may trigger a corresponding way of handling, transmitting, enabling access, storing, or the like. Additionally, certain designations may trigger different levels of security. For example, one designation for an electronic communication may trigger the system to send the electronic communication unencrypted, while another designation for the electronic communication trigger the system to encrypt the electronic communication and send the encrypted electronic communication.

FIGS. 2-6 describe various functionalities that may be facilitated by the mail server 105 and/or other components related to managing and storing electronic communications. Although FIGS. 2-6 describe functionalities associated with managing and storing emails, it should be appreciated that other types of electronic communications are envisioned.

Figure 2:
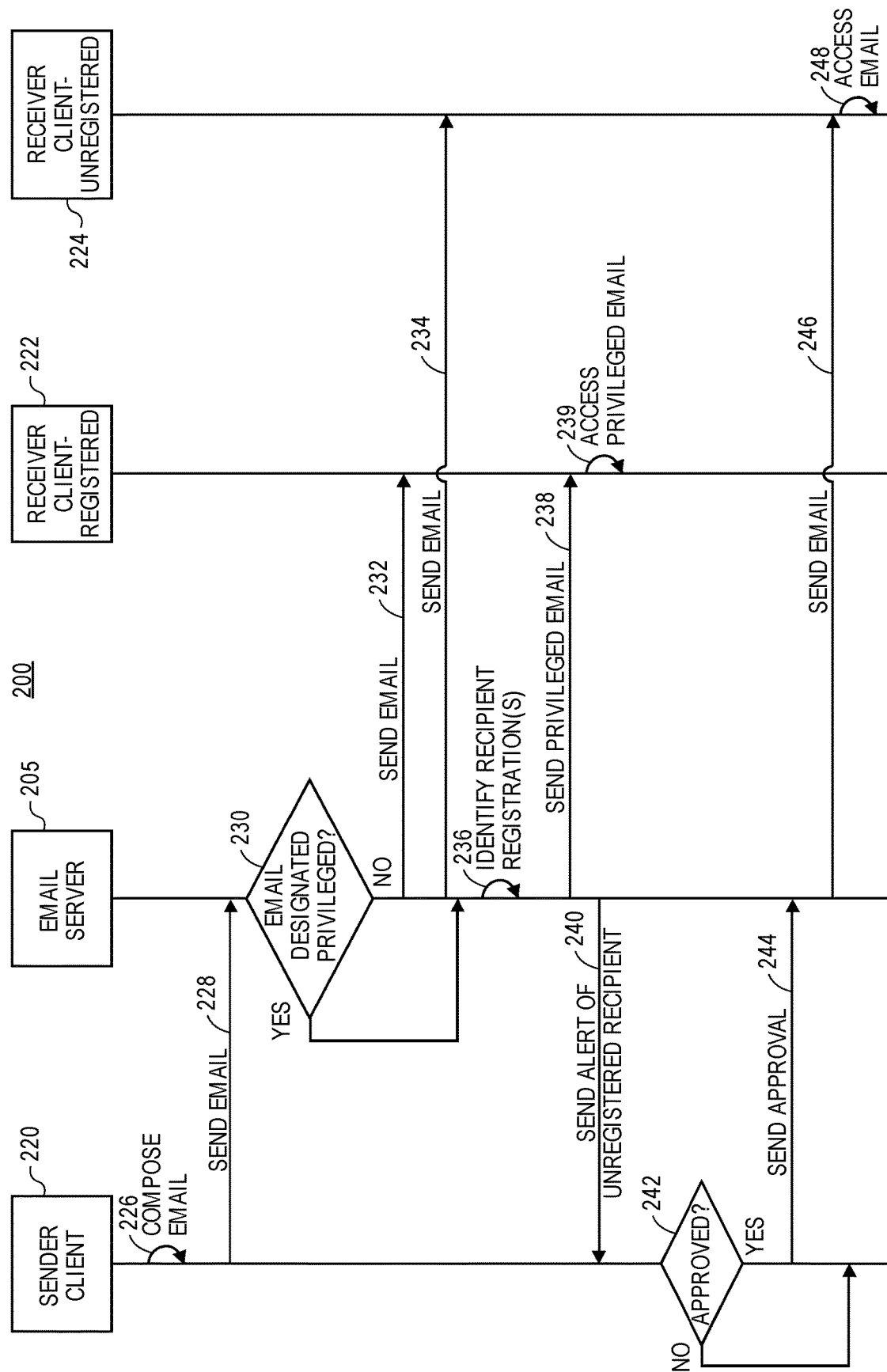
FIG. 2 depicts an exemplary signal diagram associated with managing electronic communications having certain designations, in accordance with some embodiments.

FIG. 2 depicts a signal diagram 200 associated with managing email transmission to various recipient users. In particular, the signal diagram 200 depicts functionalities associated with sending an email with a certain designation to both registered and unregistered recipients. The signal diagram 200 includes various components including: an email server 205 (such as the email server 105 as discussed with respect to FIG. 1), a sender client 220, a registered receiver client 222 and an unregistered receiver client 224. Although FIG. 2 depicts two receiver clients, it should be appreciated that alternative or additional receiver devices are envisioned. It should be appreciated that the email server 205 may encompass a database, storage, memory, or the like (such as the database 106 as discussed with respect to FIG. 1) that may be configured to store data related to electronic communications such as emails. Although the following describes an email being set with a designation of "privileged", it should be appreciated that other electronic communications having other designations are envisioned.

The clients 220, 222, 224 may be any type of client or device, such as any of the devices 101, 102, 103, 107, 108, 109 as discussed with respect to FIG. 1. According to embodiments, a user associated with the registered receiver client 222 may be registered or authorized to receive emails having a certain designation. In contrast, a user associated with the unregistered receiver client 224 may not be registered or authorized to receive emails having a certain designation.

According to embodiments, the email server 205 may be associated with an organization, company, or other type of entity, where at least one of the clients 220, 222, 224 may be internal to, registered with, or otherwise associated with the organization, company, or other type of entity. For example, the sender client 220 and the unregistered receiver client 224 may each be internal to an entity that supports the email server 205. As another example, just the registered receiver client 222 may be internal to an entity that supports the email server 205.

The signal diagram 200 may begin when a user of the sender client 220 uses the sender client 220 to compose (226) an email. In embodiments, the user may specify a set of recipients (e.g., using an email address for each of the recipients), and may input a subject line, body section, or any other field. Further, the user may select to designate the email as privileged. In some scenarios, the default setting may be that the email is privileged, in which case the user need not explicitly designate the email as privileged. In other implementations, the user may explicitly designate the email as privileged, such as via a selection in a user interface.

The sender client 220 may send (228) the email to the email server 205, either via an internal or external network connection. The email server 205 may examine the email to determine (230) whether the email has been designated as privileged. If the email server 205 determines that the email has not been designated as privileged ("NO"), the email server 205 may treat the email as a "normal" email communication. In particular, the email server 205 may send (232) the email to the registered receiver client 222 and send (234) the email to the unregistered receiver client 224. Subsequent to the email server 205 sending the email to the registered receiver client 222 and the unregistered receiver client 224, processing may end, repeat, or proceed to other functionality.

If the email server 205 determines that the email has been designated as privileged ("YES"), the email server 205 may identify the registration(s) of the recipient(s) specified in the email. In particular, the email server 205 may, for each of the recipient(s), determine whether the recipient is a user who is registered to receive emails that are designated as privileged. To make the determination, the email server 205 may interface with a database or other type of data storage device that may store a directory including an indication of whether users are registered.

In the scenario depicted in the signal diagram 200, it should be appreciated that the user of the registered receiver client 222 is registered to receive emails that are designated as privileged, and the user of the unregistered receiver client 224 is not registered to receive emails that are designated as privileged. Accordingly, the email server 205 may send (238) the email having a privileged designation to the registered receiver client 222. The registered user may use the registered receiver client 222 to access (239) the privileged email.

Additionally, instead of sending the privileged email to the unregistered receiver client 224, the email server 205 may generate and send (240) an alert of the unregistered recipient to the sender client 220. In embodiments, the alert may indicate that the user of the unregistered receiver client 224 is an unregistered user, and may prompt or request the user of the sender client 220 to approve or reject the transmission of the email to the unregistered user. It should be appreciated that the email server 205 may send the alert via any type of communication and/or via any channel, such as an email or as another type of electronic communication.

The user of the sender client 220 may use the sender client 220 to select (242) whether to approve transmission of the email to the unregistered user. It should be appreciated that the user of the sender client 220 may be the same as of different from the user who composed the email. If the user does not approve transmission of the email to the unregistered user ("NO"), processing may end, repeat, or proceed to other functionality. If the user approves transmission of the email to the unregistered user ("YES"), the sender client 220 may send (244) an approval to the email server 205. Accordingly, the email server 205 may send (246) the email to the unregistered receiver client 224. In embodiments, the email may indicate (or not indicate) that the email was originally designated as privileged. The unregistered user may use the unregistered receiver client 224 to access (248) the email. It should be appreciated that the email server 205 may send the email to the unregistered receiver client 224 before, concurrently with, or after sending the email to the registered receiver client 222.

In embodiments, the email server 205 may update a log to reflect communication activity associated with the email. In particular, the email server 205 may update the log to reflect that the email (and its corresponding "privileged" designation) was sent to the registered receiver client 222, that the sender client 220 approved sending the email to the unregistered receiver client 224, and/or that the email was sent to the unregistered receiver client 224. The log may also include the email itself.

Figure 3:
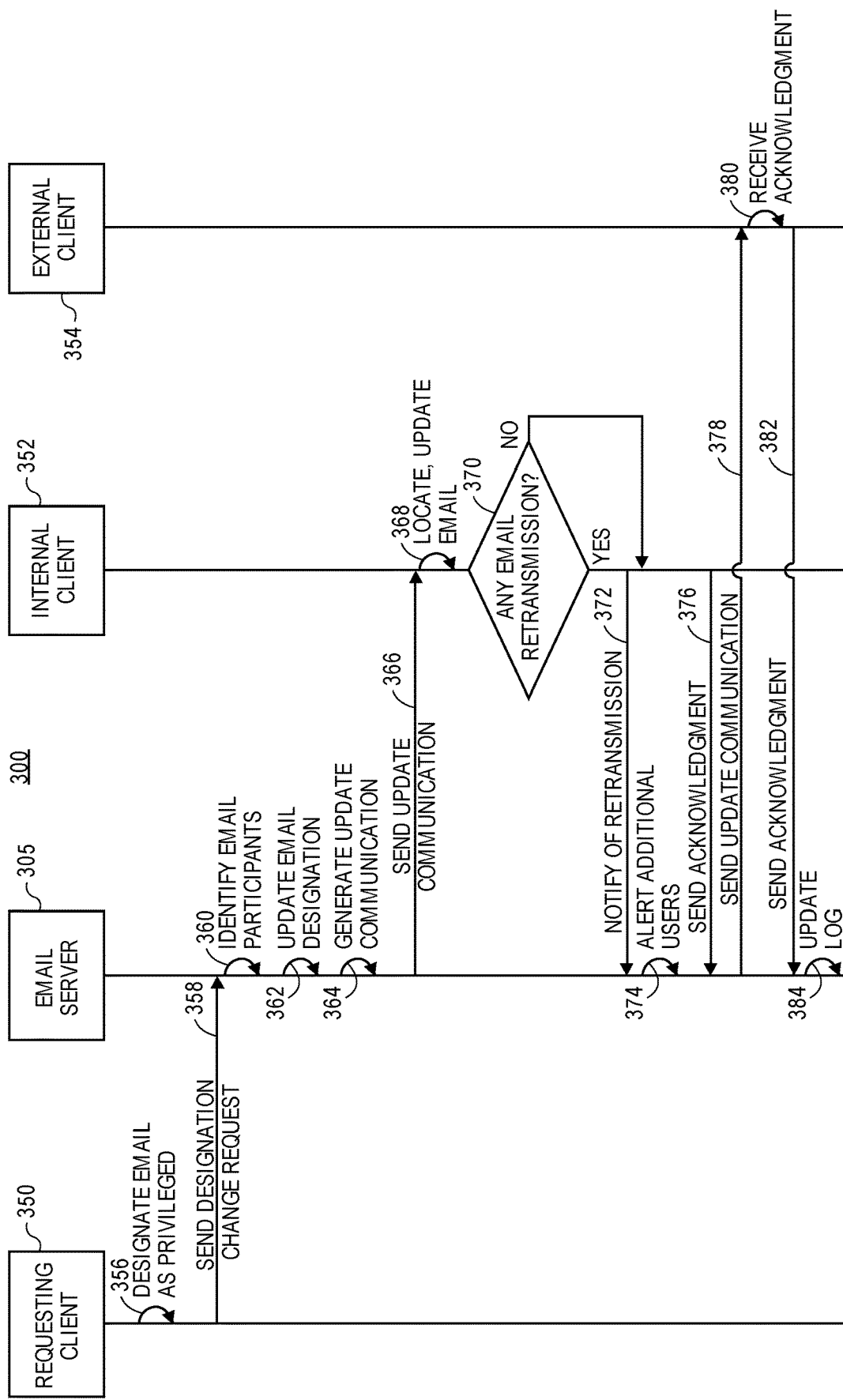
FIG. 3 depicts an exemplary signal diagram associated with enabling users to classify electronic communications with certain designations, in accordance with some embodiments.

FIG. 3 depicts a signal diagram 300 associated with classifying emails with a certain designation. In particular, the signal diagram 300 depicts functionalities associated with enabling a user to classify a previously-sent or received email as privileged. The signal diagram 300 includes various components including: an email server 305 (such as the email server 105 as discussed with respect to FIG. 1), a requesting client 350, an internal client 352, and an external client 354. Although FIG. 3 depicts three total clients, it should be appreciated that alternative or additional clients are envisioned. Further, although the following describes an email being set with a designation of "privileged", it should be appreciated that other electronic communications having other designations are envisioned.

The clients 350, 352, 354 may be any type of client, such as any of the clients 101, 102, 103, 107, 108, 109 as discussed with respect to FIG. 1. According to embodiments, the email server 305 may be associated with an organization, company, or other type of entity, where the internal client 352 may be internal to the organization, company, or other type of entity, the external client 354 may be external to the organization, company, or other type or entity, and the requesting client 350 may be either internal or external to the organization, company, or other type of entity.

The signal diagram 300 may begin when a user of the requesting client 350 requests (356) to classify a particular email as privileged. According to embodiments, the particular email may have already been sent from a sender and delivered to one or more recipients, where the particular email was not originally designated as privileged. Further, the user of the requesting client 350 may have originally been the sender or one of the recipients; or may have not been included on the original email (e.g., the user may be an administrator or another individual with access to the particular email).

The requesting client 350 may send (358) a designation change request for the email to the email server 305, such as via any type of internal or external network connection. In embodiments, the designation change request may specify an entire email or a portion of the email. For example, the requesting user may want to designate a portion of an email as "privileged," while leaving the remainder of the email without a designation. In this situation, the designation change request may identify the email as well as the portion of the email that should undergo the designation change.

After receiving the designation change request, the email server 305 may identify (360) participants of the email. In particular, the email server 305 may identify the original sender and recipient(s) of the email. For purposes of explanation, it should be appreciated that the internal client 352 and the external client 354 were each either the original sender or a recipient of the email. Further, the email server 305 may update (362) a designation for the email. In particular, the email server 305 may interface with an appropriate database to update a record or log to indicate that the email is privileged.

Although not illustrated in FIG. 3, it should be appreciated that the email server 305 may determine whether to update the designation for the email. In particular, the email server 305 may determine to deny the designation change request based on one or more factors, in which case the email server 305 may not update the designation for the email. In an implementation, a user of the email server 305 may view the designation change request and may select to approve or reject the designation change request.

The email server 305 may also generate (364) an update communication that indicates that the email has been designated as privileged. It should be appreciated that the update communication may be an email or any other type of electronic communication. The email server 305 may send (366) the update communication to the internal client 352. In embodiments, the internal client 352 may display or present the update communication (e.g., as a newly-received email) to a user. Accordingly, the user may access or view the update communication to be notified of the change in designation to the email.

The internal client 352 may locate (368) the email and update the designation of the email according to the designation change request. For example, a communication application or the internal client 352 may locate the email within the application and update the designation appropriately. In embodiments, the internal client 352 may automatically locate the email and update the designation of the email without any user input or intervention. Although not illustrated in FIG. 3, it should be appreciated that the internal client 352 may determine whether to update the designation for the email. In particular, the internal client 352 may determine to deny the designation change based on one or more factors, in which case the internal client 352 may not update the designation for the email. In an implementation, a user of the internal client 352 may view the update communication and may select to accept or reject the designation change.

The internal client 352 may also determine (370) if the email was forwarded, replied to, and/or the like (generally, retransmitted). In particular, the internal client 352 may locate (e.g., via searching, scanning, or detecting) any additional instances of the email, such as if an email thread (i.e., one or more additional emails) was started using the email specified in the designation change request. The additional instances of the email may, in some cases, have been forwarded to one or more individuals who did not receive the original email.

If the internal client 352 determines that the email was retransmitted ("YES"), the internal client 352 may notify (372) the email server 305 of the retransmission. In particular, the internal client 352 may send a notification of the retransmission, identifying any additional users to which the email was retransmitted. The email server 305 may accordingly update a log or record corresponding to the email to reflect the retransmission activity.

The email server 305 may also alert (374) the additional user(s) involved in the retransmission(s) that the email has been designated as privileged. In particular, the email server 305 may send an update communication that indicates that the email has been designated as privileged. It should be appreciated that the update communication may be an email or any other type of electronic communication. Accordingly, the additional user(s) may access or view the update communication to be notified of the change in designation. In some implementations, the internal client 352 may initiate the communication to the additional user(s) involved in the retransmission(s).

After identifying any email retransmission or if the internal client determines that the email was not retransmitted ("NO"), the internal client 352 may send (376) an acknowledgement to the email server 305. In embodiments, the acknowledgement indicates that the internal client 352 has acknowledged the change in designation. In some implementations, such as if the internal client 352 initiates the communication to the additional user(s) involved in the retransmission(s), the internal client 352 may send acknowledgement(s) indicating that any additional user(s) have acknowledged the change in designation, or have otherwise that the additional user(s) have received notice of the change in designation.

If the email corresponding to the designation change request included any external users or collaborators, the email server 305 may send (378) an update communication to the appropriate external client 354, where the update communication may indicate that the email has been designated as privileged. It should be appreciated that the update communication may be an email or any other type of electronic communication. In embodiments, the external client 354 may display or present the update communication (e.g., as a newly-received email) to the external user. Accordingly, the external user may access or view the update communication to be notified of the change in designation. Although not illustrated in FIG. 3, it should be appreciated that the external client 354 may determine whether to update the designation for the email. In particular, the external client 354 may determine to deny the designation change based on one or more factors, in which case the external client 354 may not update the designation for the email. In an implementation, a user of the external client 354 may view the update communication and may select to reject the designation change.

The external client 354 may receive (380) an acknowledgement of the change in designation. In an implementation, the external user may explicitly select that he/she has acknowledged the change in designation. In another implementation, the external client 354 may automatically acknowledge the change in designation without any user intervention. In either implementation, the external client 354 may send (382) an acknowledgement to the email server 305. Accordingly, the email server 305 may update (384) a record or log associated with the email to reflect the acknowledgement.

Figure 4:
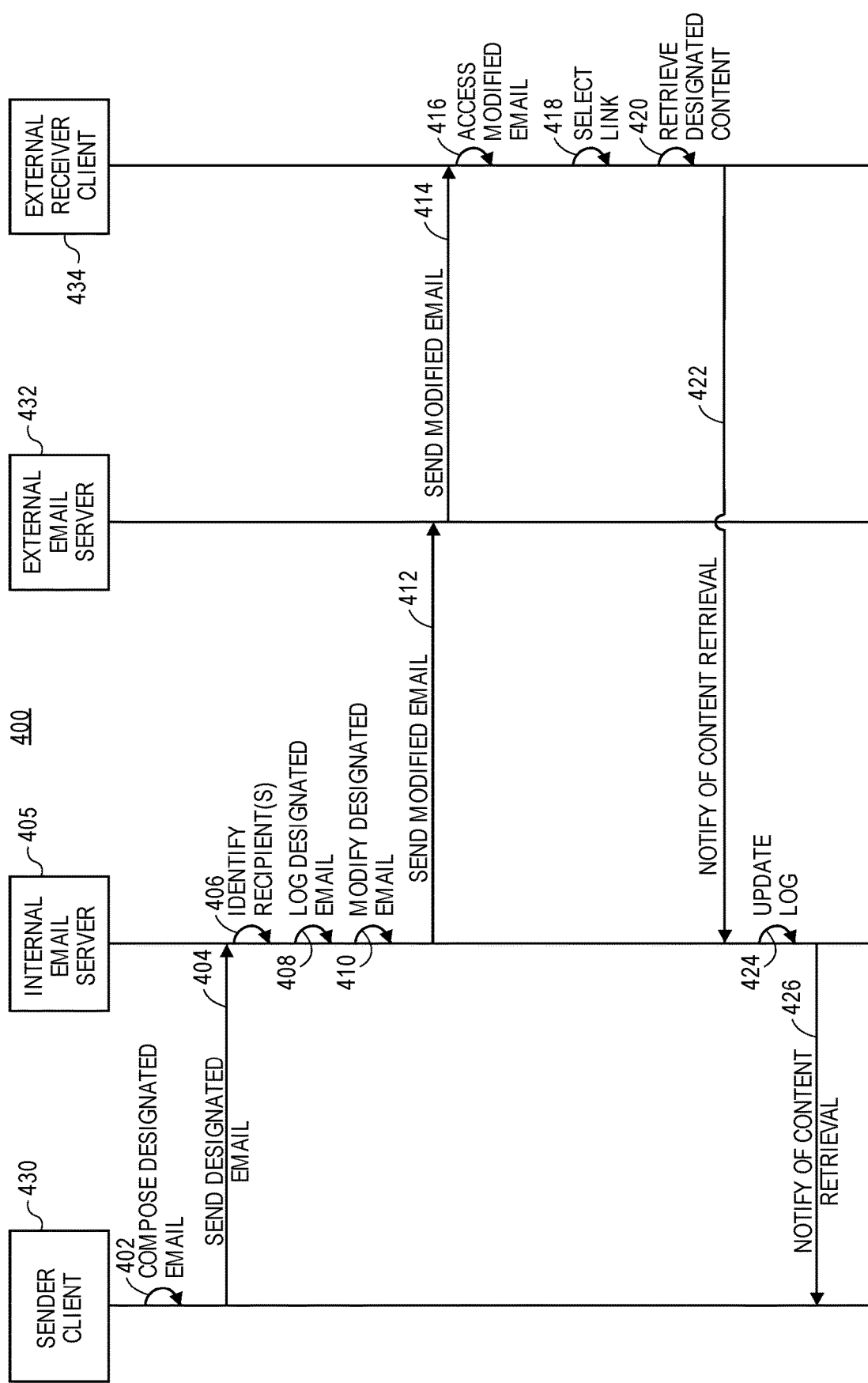
FIG. 4 depicts an exemplary signal diagram associated with managing electronic communications having certain designations, in accordance with some embodiments.

FIG. 4 depicts a signal diagram 400 associated with managing privileged emails. In particular, the signal diagram 400 depicts functionalities associated with managing the transmission of an email that is designated as privileged. The signal diagram 400 includes various components including: a sender client 430, an internal email server 405, an external email server 432, and an external receiver client 434. Although FIG. 4 depicts two total clients, it should be appreciated that alternative or additional clients are envisioned. Further, although the following describes an email being set with a designation of "privileged", it should be appreciated that other electronic communications having other designations are envisioned.

The clients 430, 434 may be any type of client, such as any of the clients 101, 102, 103, 107, 108, 109 as discussed with respect to FIG. 1. According to embodiments, the sender client 430 and the internal email server 405 may be internal to an organization, company, or other type of entity, and the external email server 432 and the external receiver client 434 may be external to the organization, company, or other type or entity.

The signal diagram 400 may begin when a user of the sender client 430 uses the sender client 430 to compose (402) an email with a privileged designation. In embodiments, the email specifies at least one recipient user who may be the user of the external receiver client 434. The sender client 430 may send (404) the designated email to the internal email server 405 via a network connection. The internal email server 405 may examine the email to determine its designation (i.e., privileged) and identify (406) its recipient(s), where one of the recipients is a user of the external receiver client 434. The internal email server 405 may also determine whether the recipient(s) are registered or authorized to receive privileged emails, such as by accessing a register, list, or the like. For purposes of explanation, it should be assumed that the user of the external receiver client 434 is not registered to receive privileged emails.

The internal email server 405 may log (408) the designated email. In particular, the internal email server 405 may store, in memory, a record or log associated with the email, including such information as the classification/designation (i.e., privileged), the identity of the sending user, the one or more identities of the recipient user(s), and/or whether the recipient user(s) are registered to receive privileged emails.

Because the user of the external receiver client 434 is not registered to receive privileged emails, the internal email server 405 may modify (410) the designated email. In some embodiments, the internal email server 405 may replace any content in the email (e.g., a body section of the email) that has been designated as privileged with a hyperlink or some other selectable object that may enable the recipient user to access the content. In embodiments, the internal email server 405 may host a website from which the content may be accessed. In this regard, when a user access the selectable object, the user will be directed to the website. It should be appreciated that the internal email server 405 may replace any or all content included in any portion (e.g., body section, heading information, metadata, etc.) of the email. Additionally, it should be appreciated that the internal email server 405 may automatically modify the designated email according to a set of parameters or techniques, or may interface with a user who may select how to modify the designated email. In embodiment, the internal email server 405 may remove one or more attachments that may be included in the designated email.

After modifying the email, the internal email server 405 may send (412) the modified email to the external email server 432 via a network connection such as the Internet. The external email server 432 may receive the modified email and accordingly send (414) the modified email to the external receiver client 434 via a network connection. The user of the external receiver client 434 (i.e., the recipient user) may use the external receiver client 434 to access (416) the modified email.

In accessing the modified email, the recipient user may notice that the content originally included in the email has been replaced with a link (or other object or information), along with optional information that may instruct the recipient user how to access the content (e.g., by selecting the link). Accordingly, the recipient user may use the external receiver client 434 to select (418) the link or other object, which may cause the external receiver client 434 to retrieve (420) the designated content. In an implementation, the external receiver client 434 may access a website (e.g., hosted by the internal email server 405) indicated in the link to access the designated content. In some embodiments, the website may require the recipient user to log in or otherwise provide some form of user credentials to access the content. Further, in some embodiments, the external receiver client 434 may retrieve any attachment(s) that may have been removed from the designated email.

After the recipient user accesses the designated content, the external receiver client 434 may notify (422) the internal email server 405 that the designated content was retrieved or accessed. In some embodiments, the website that hosts or otherwise includes the content may automatically and without user intervention notify the internal email server 405 that the recipient user accessed the content. It should be appreciated that the internal email server 405 may be notified of the content access via other techniques.

After receiving notification of the content access, the internal email server 405 may update (424) the log to reflect that the recipient user accessed or retrieved the content. The internal email serve 405 may also notify (426) the sender client that the recipient user accessed or retrieved the content. In an implementation, the internal email server 405 may generate an email (or other type of communication) and send the email to the sender client 430 where it may be accessed or viewed by the sending user.

Figure 5:
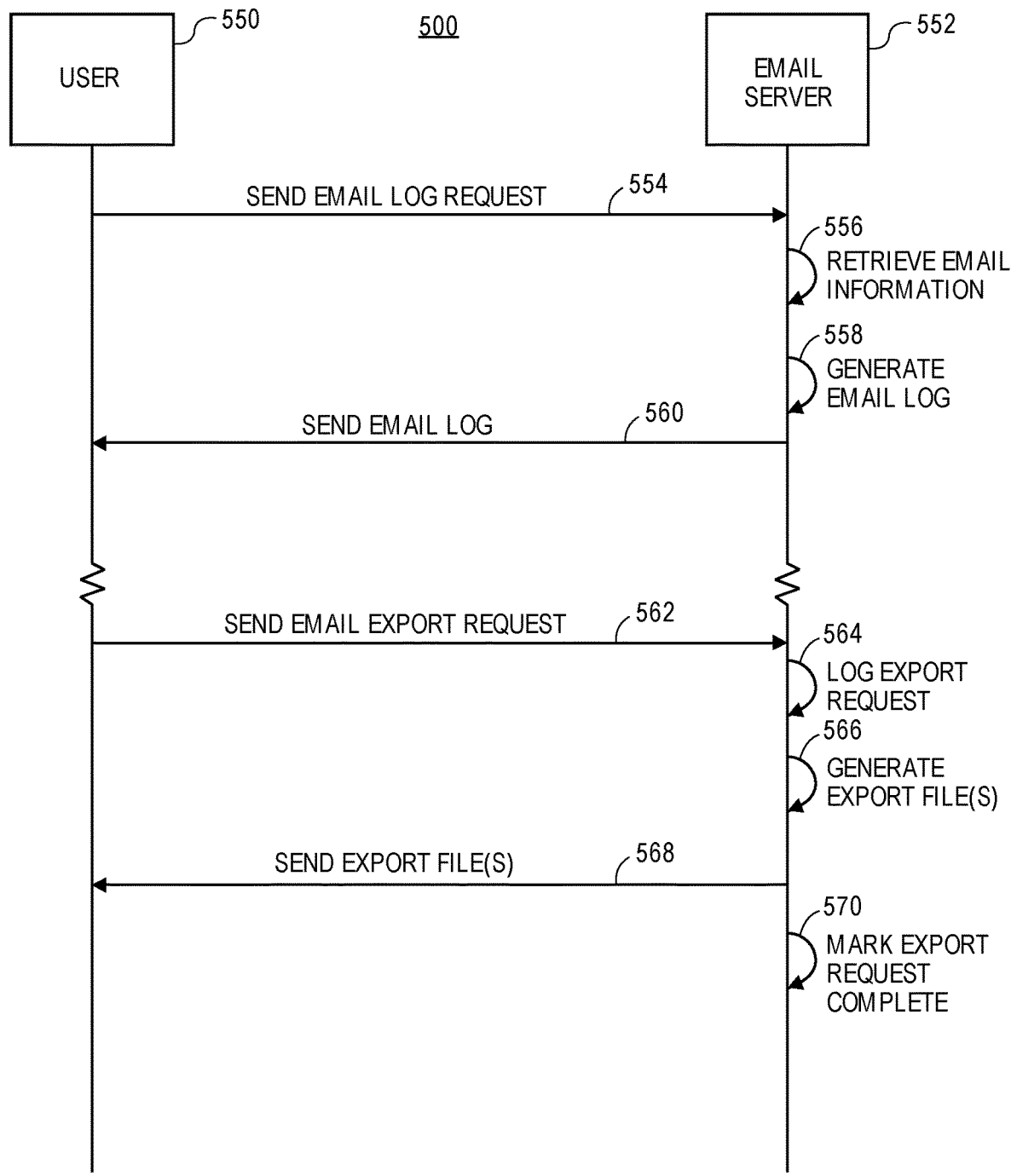
FIG. 5 depicts an exemplary signal diagram associated with generating electronic communication logs and files, in accordance with some embodiments.

FIG. 5 depicts a signal diagram 500 associated with retrieving and providing email logs and export requests. In particular, the signal diagram 500 depicts functionalities associated with enabling a user to request a log for a particular email and/or submit an export request for emails having certain designations. The signal diagram 500 includes various components including: a user 550 and an email server 552. Although the following describes functionalities associated with emails, it should be appreciated that other electronic communications are envisioned.

In some scenarios, the user 550 and the email server 552 may be internal to the same organization, company, or other type of entity, where the user 550 may be an email user or administrator. In other scenarios, the user 550 may be an individual external to an organization, company, or other type of entity associated with the email server 552.

The signal diagram 500 may begin when the user 550 sends (554) an email log request to the email server 552. In embodiments, the email log request may identify a particular email or may request to search for emails that match a set of filters or parameters. In particular, the email log request may indicate a timeframe corresponding to when the email may have been sent or retransmitted, a designation (e.g., "privileged"), a sender(s), a recipient(s), a tag(s), a keyword(s), and/or other filters.

After receiving the email log request, the email server 552 may retrieve (556) information associated with any email(s) that match the email log request. In particular, the email server 552 may retrieve information such as the original sender and recipient(s) of the email(s), any instances of the email being retransmitted (e.g., forwarded, replied to) along with any additional recipient(s) of the retransmission instances, any designated classifications of the email(s) and its retransmission(s), the registration status of the sender and recipient(s) of the original email(s) and any retransmission(s), whether the sender and recipient(s) of the original email(s) and any retransmission(s) were external or internal to a particular organization (e.g., the organization associated with the email server 552), time(s) corresponding to when the email(s) was sent or retransmitted, and/or other information.

After retrieving the email information, the email server 552 may generate (558) an email log that includes the retrieved email information. The email server 552 may send (560) the email log to the user 550. In this regard, the user 550 may access the email log to view any desired information.

Additionally or alternatively to sending the email log request, the user 550 may send (562) an email export request to the email server 552. In embodiments, the email export request may include various parameters such as a timeframe or date range, a list of individuals who may be senders and recipients of emails, a designated classification (or lack thereof), a set of tags, a set of keywords, and/or the like. For example, an email export request may request any emails sent or received by internal users from January 1 to March 31 that match the keyword "Finance," where the emails have not been designated as privileged.

After receiving the email export request, the email server 552 may log (564) the export request. In particular, the email server 552 may record the instance of the email export request and any information included therewith, and may instruct certain resources to initiate the email export according to the request. The email server 552 may generate (566) the export file(s). In embodiments, the export file(s) may include any emails that align with the email export request. Continuing with the above example, the export file(s) may include any emails sent or received by internal users from January 1 to March 31 that match the keyword "Finance," where the emails have not been designated as privileged. The export file(s) may also include a set of logs for the emails that identify individuals who have sent or received the emails, any email retransmission information, and/or other information.

The email server 552 may send (568) the export file(s) to the user 550. In this regard, the email server 552 may send, to the user 550, only the emails that have the designated classification (e.g., privileged). Accordingly, the user 550 may access and review the contents of the export file(s) as needed. The email server 552 may also log or mark (570) the export request as complete.

FIGS. 6-11 illustrate exemplary interfaces associated with the present embodiments. One or more electronic devices (e.g., a computer, a mobile device, etc.) may be configured to display the interfaces and/or receive selections and inputs via the interfaces, where the electronic device(s) may be associated with a user or administrator of a communication application or platform. For example, an email application or platform that is configured to operate on the electronic device may display the interfaces. It should be appreciated that the interfaces are merely exemplary and that alternative or additional content is envisioned.

Figure 6:
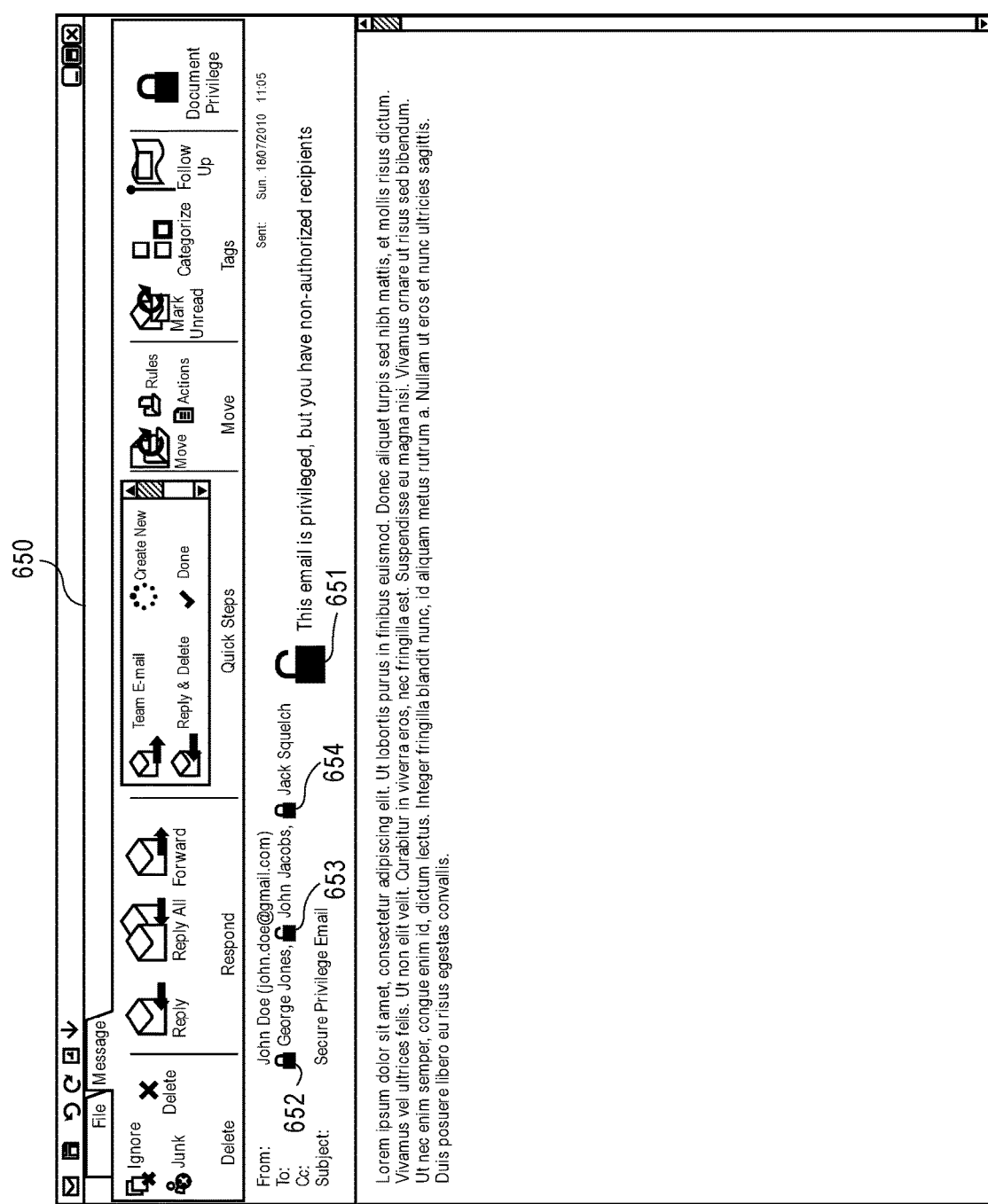
FIGS. 6-11 depict exemplary user interfaces associated with managing electronic communications, in accordance with some embodiments.

FIG. 6 illustrates an interface 650 depicting a communication (as shown: an email) that is composed and sent by a user "John Doe," where the interface may be displayed by a communication application associated with user John Doe. The interface 650 identifies a set of recipients who received the email: George Jones, John Jacobs, and Jack Squelch.

The interface 650 further includes an indication 651 (as shown: a depiction of an unlocked padlock) that indicates that the email was designated as privileged, but that there are non-authorized recipients (i.e., any recipients who are not registered to receive privileged emails). In particular, the interface 650 includes a set of indications 652, 653, 654 that indicates that recipient George Jones is authorized, and that recipients John Jacobs and Jack Squelch are not authorized. Accordingly, the sending user (i.e., John Doe) is able to efficiently and effectively ascertain whether the email was sent to non-authorized recipients, and identify which, if any, recipients are not authorized.

Although the interface 650 depicts an email that has already been sent, it should be appreciated that the embodiments may support a similar interface for an email that is composed (or is being composed) but has not yet been sent. In particular, the communication application may dynamically determine whether the specified recipient(s) are authorized, and may display indications similar to those of the interface 650 as appropriate. Accordingly, the user is able to ascertain which recipient(s) are authorized and which recipient(s) are not authorized before sending the email.

In embodiments, the systems and methods may enable a user or administrator of a communication platform to configure a user for sending and receiving emails of certain designations (i.e., may authorize the user). In operation, the user or administrator may initiate an authorization request identify a user to authorize, and a component (e.g., the mail server 105) may receive the authorization request and determine whether the user needs to be authorized according to the request. In particular, the component may access one or more directories (e.g., a corporate directory system and/or a designation control system) to identify authorizations and privileges for the user.

If the component determines that the one or more directories need to be updated to reflect the authorization, the component may accordingly update the one or more directories, such as by adding an appropriate authorization status. In embodiments, the component may also generate and send a communication (e.g., an email) to the user to inform the user that he/she has been authorized according to the original request. For example, the communication to the user may indicate that the user is authorized to send and receive emails designated as privileged.

Figure 7:
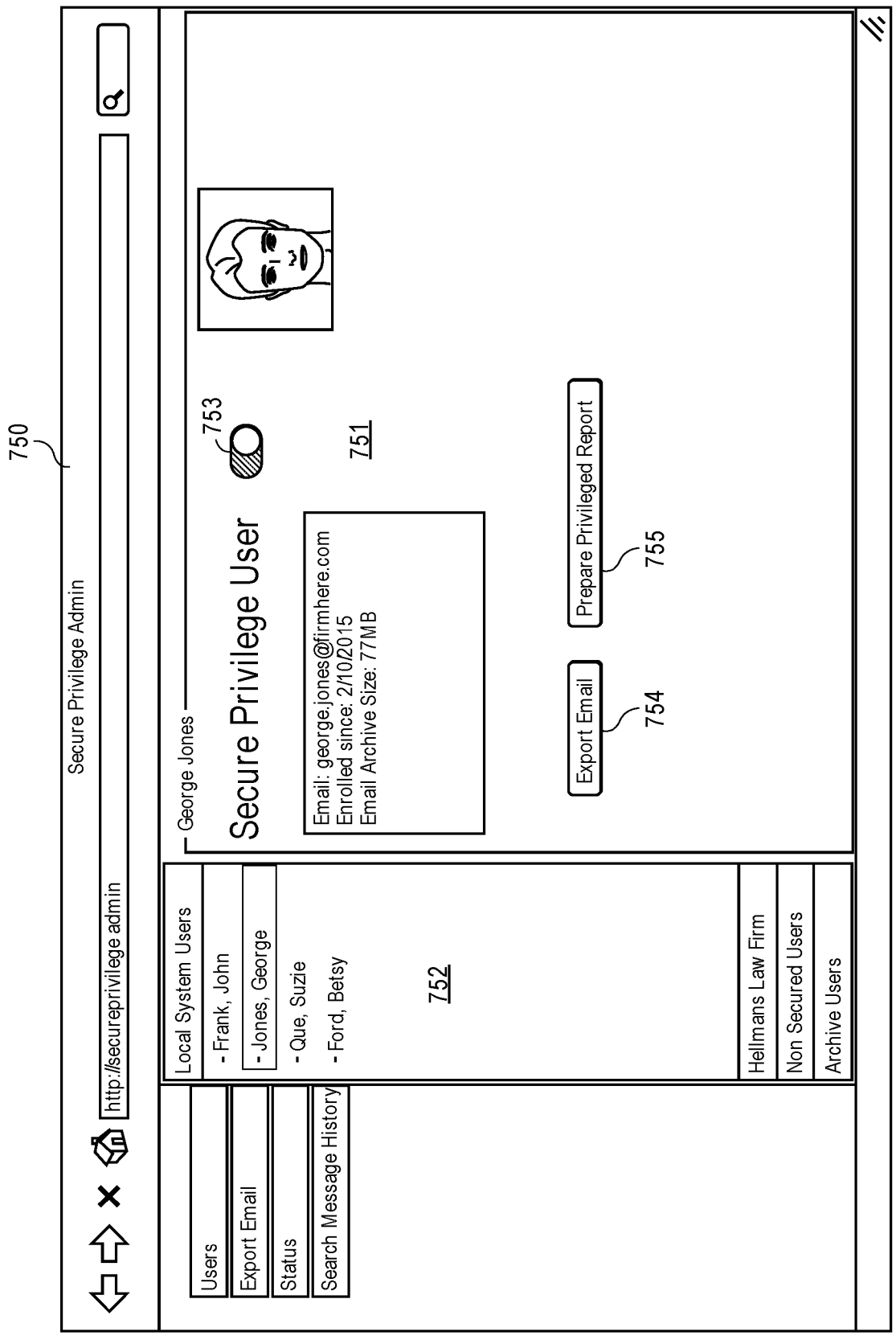

FIG. 7 illustrates an interface 750 associated with ascertaining and modifying authorization levels of users, where the interface 750 may be accessed by an administrator or other user of a communication platform. The interface 750 includes a user selection area 752 that lists users of the platform, where the user selection area 752 enables the administrator to select the users for more information. As shown in FIG. 7, the administrator has selected George Jones.

After the administrator selects a user, the interface 750 may display an information section 751 associated with the selected user. The information section 751 may include information such as a name, email address, photo, and/or other information. The information section 751 may further include an authorization status 753 of the user. As illustrated in FIG. 7, the authorization status 753 indicates that George Jones is authorized for privileged communication.

In embodiments, the interface 750 may enable the administrator to change, using the authorization status 753, the authorization for the user. In particular, the administrator may toggle the authorization status 753 to grant authorization or remove authorization, as appropriate. The information section 751 further includes an export email selection 754 that, upon selection, causes the communication application to export emails associated with the selected user, and a report selection 755 that, upon selection, causes the communication application to prepare a report detailing any privileged communications prepared or received by the user.

Figure 8:
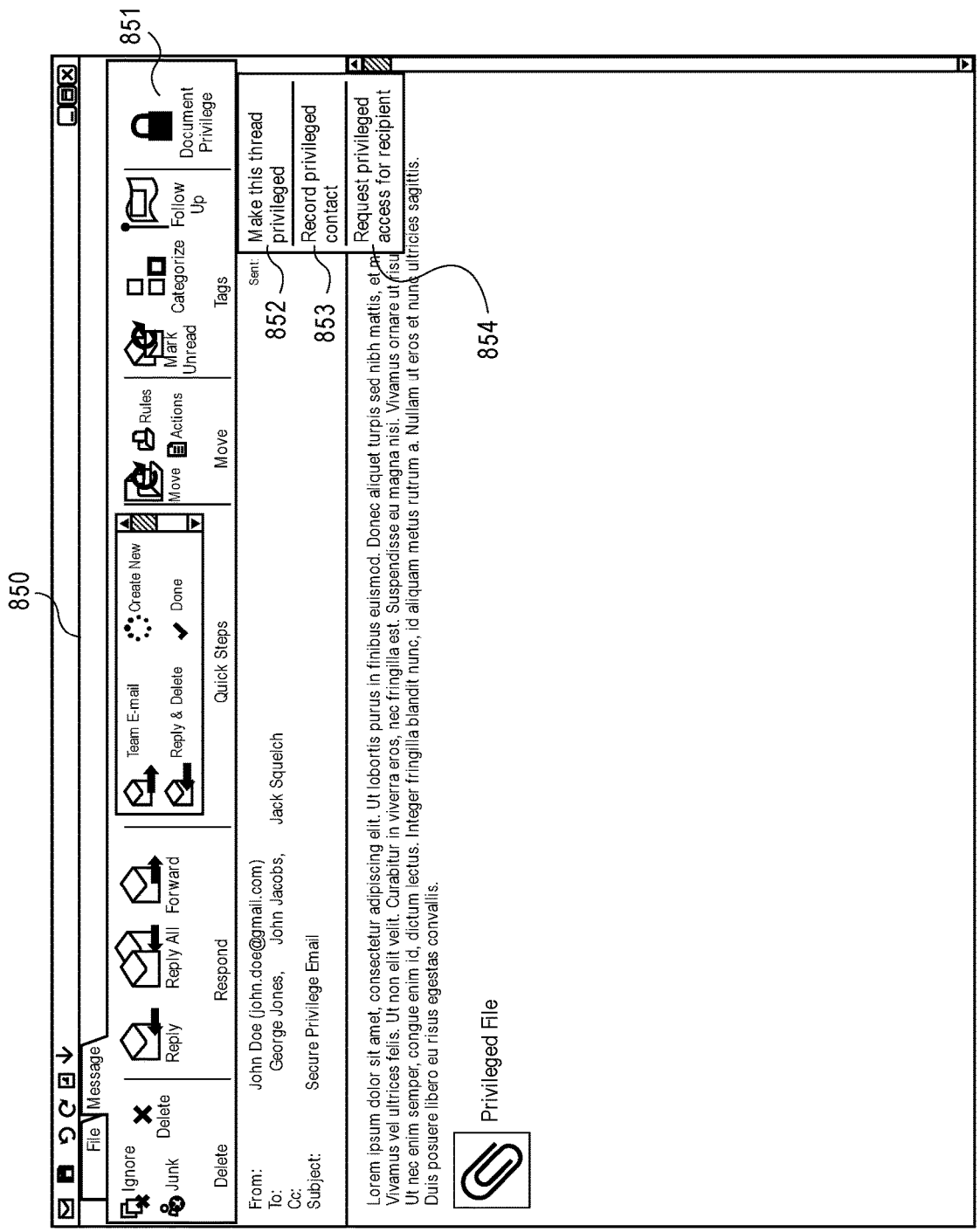

FIG. 8 illustrates an interface 850 depicting a communication (as shown: an email) that is composed and sent by a user "John Doe," where the interface may be displayed by a communication application associated with user John Doe. According to embodiments, the email of the interface 850 was previously sent to the indicated recipients, where the email may not have had a designation when sent by the user.

Accordingly, the interface 850 may enable the user (or another user such as an administrator or one of the recipients) to select a designation for the email via a designation selection 851. In response to the user selecting the designation selection 851, the interface 850 may display a set of options: an option 852 to designate the email thread as privileged, an option 853 to record a privileged contact, and an option 854 to request privileged access for a recipient.

In response to the user selecting the option 852, the communication application may perform functionalities to designate the email as privileged, as discussed with respect to FIG. 3. In response to the user selecting the option 853, the communication application may record a privileged contact. In particular, the communication application may log or record identifications of any authorized users. In response to the user selecting the option 854, the communication application may request that a non-authorized recipient be granted access for sending and receiving privileged communications, where the communication application may facilitate any functionalities resulting from this request.

Figure 9:
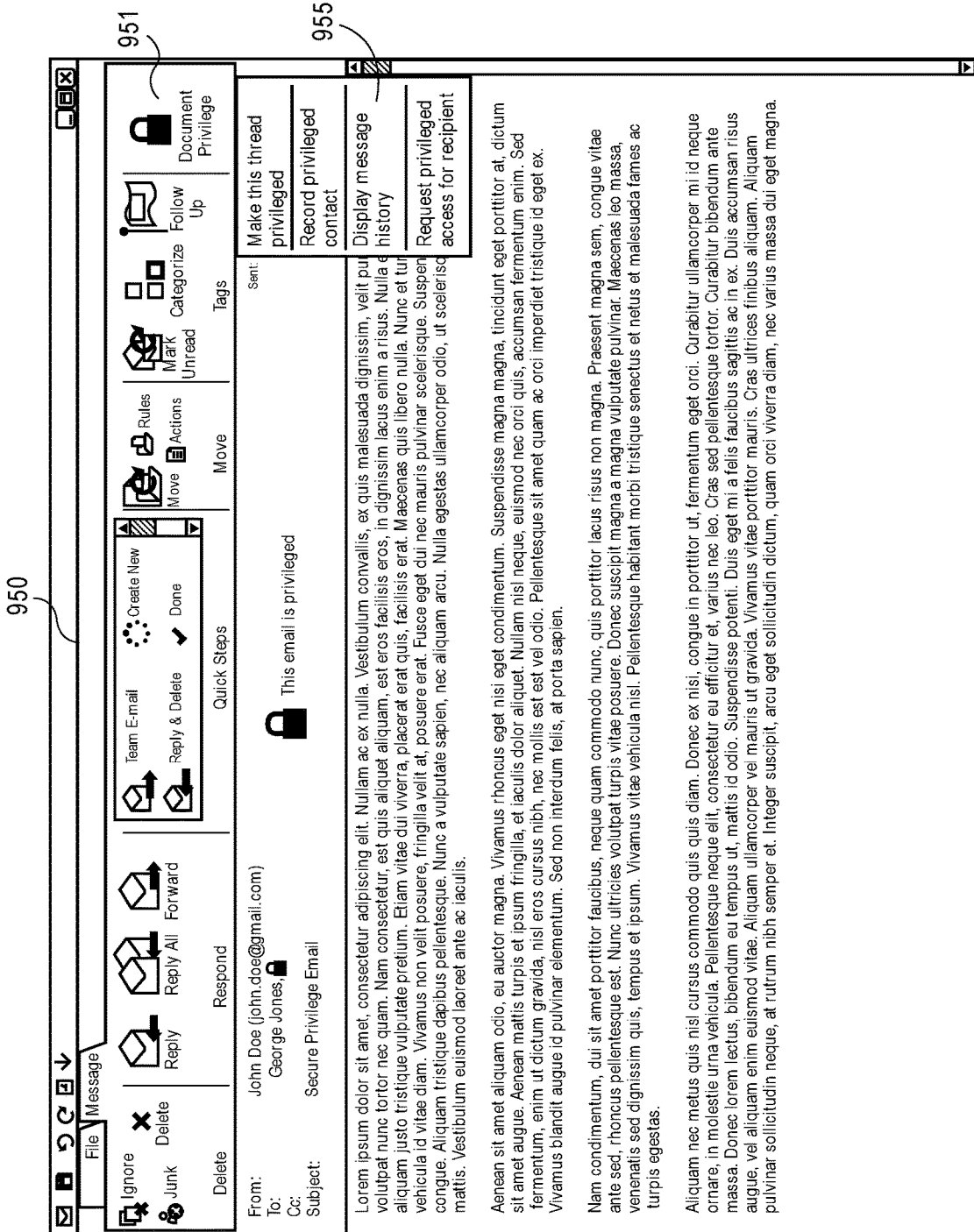

FIG. 9 illustrates an interface 950 depicting a communication (as shown: an email) that is composed and sent by a user "John Doe," where the interface may be displayed by a communication application associated with user John Doe. The email as depicted in the interface 950 may have previously been sent to the identified recipient (as shown: George Jones), and may have been designated as privileged.

The interface 950 includes a designation selection 951 that enables the user to select various options for functionalities associated with the email. As illustrated in FIG. 9, one option 955 is a display message history option. According to embodiments, in response to the user selecting the option 955, the communication application may generate and display a log associated with the email, as discussed with respect to FIG. 5.

Figure 10:
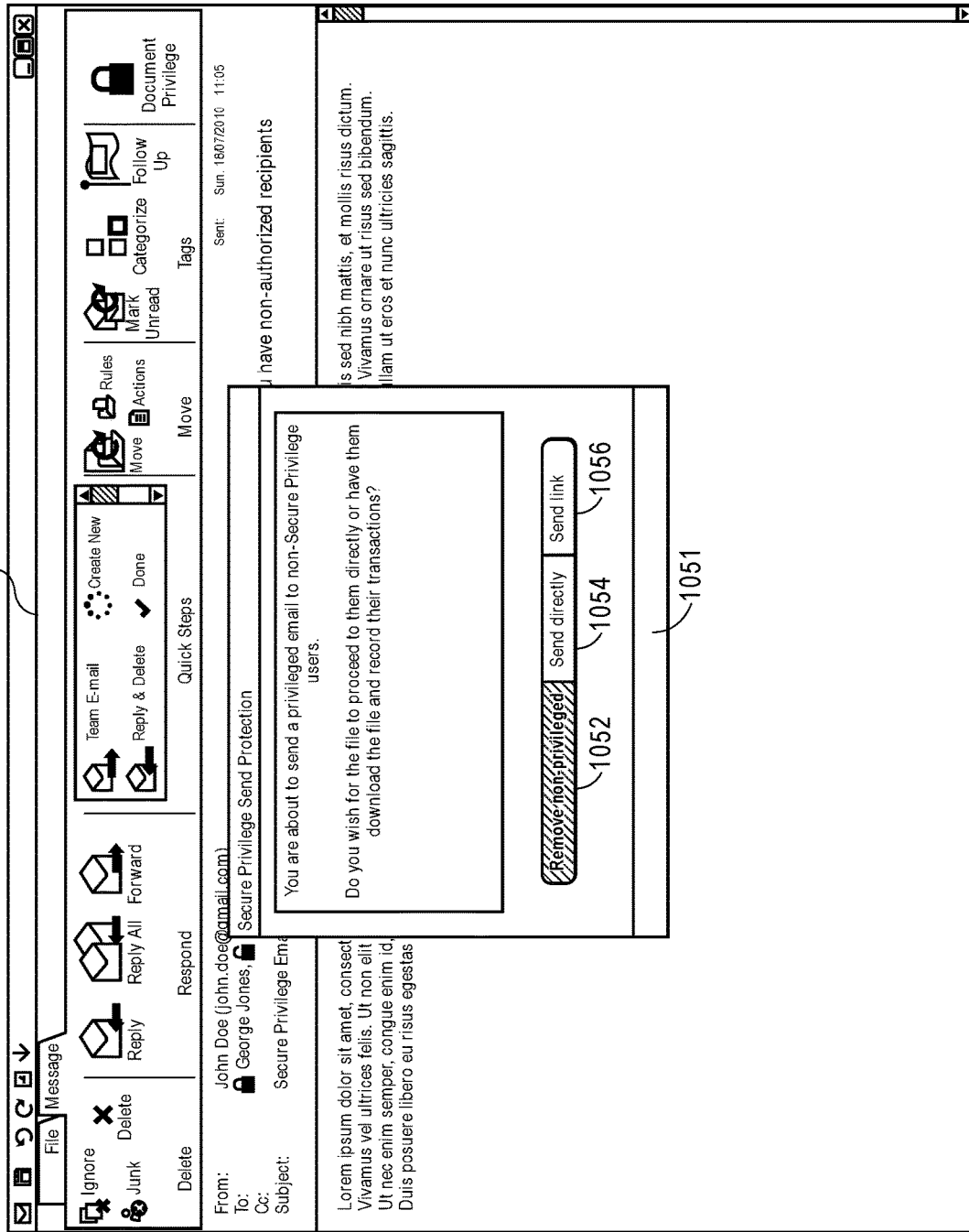

FIG. 10 illustrates an interface 1050 associated with a communication platform for sending and receiving electronic communications. In particular, the interface 1050 depicts an email application that enables a user (as shown: John Doe) to send emails that may be designated as privileged.

The user may compose an email and specify a set of recipients for the email, where each of the set of recipients may be registered to receive privileged emails or not registered to receive privileged emails. When the sending user selects a send option, and in the situation in which one of set of recipients is not registered to receive privileged emails, the email application may display a pop-up window 1051 which may indicate that the email is being sent to a recipient user who is not registered to receive privileged emails.

According to embodiments, the pop-up window 1051 may enable the sending user to select various options for how to manage communication of the email. In particular, a first option 1052 may be to remove any non-registered recipient(s) from the set of recipients, such that any non-registered recipient(s) will not receive the email. A second option 1054 may be to send the email, as is, to the recipients (including any non-registered recipient(s)), such that any non-registered recipient(s) will receive the email as originally composed. A third option 1056 may be to modify the content of the email and send a modified email containing a link to any non-registered recipient(s). In this regard, the non-registered recipient(s) may select the link to access any content that was removed or modified from the originally-composed email. In response to the sending user selecting any of the options 1052, 1054, 1056, the email application may send the email according to the selected option.

Figure 11:
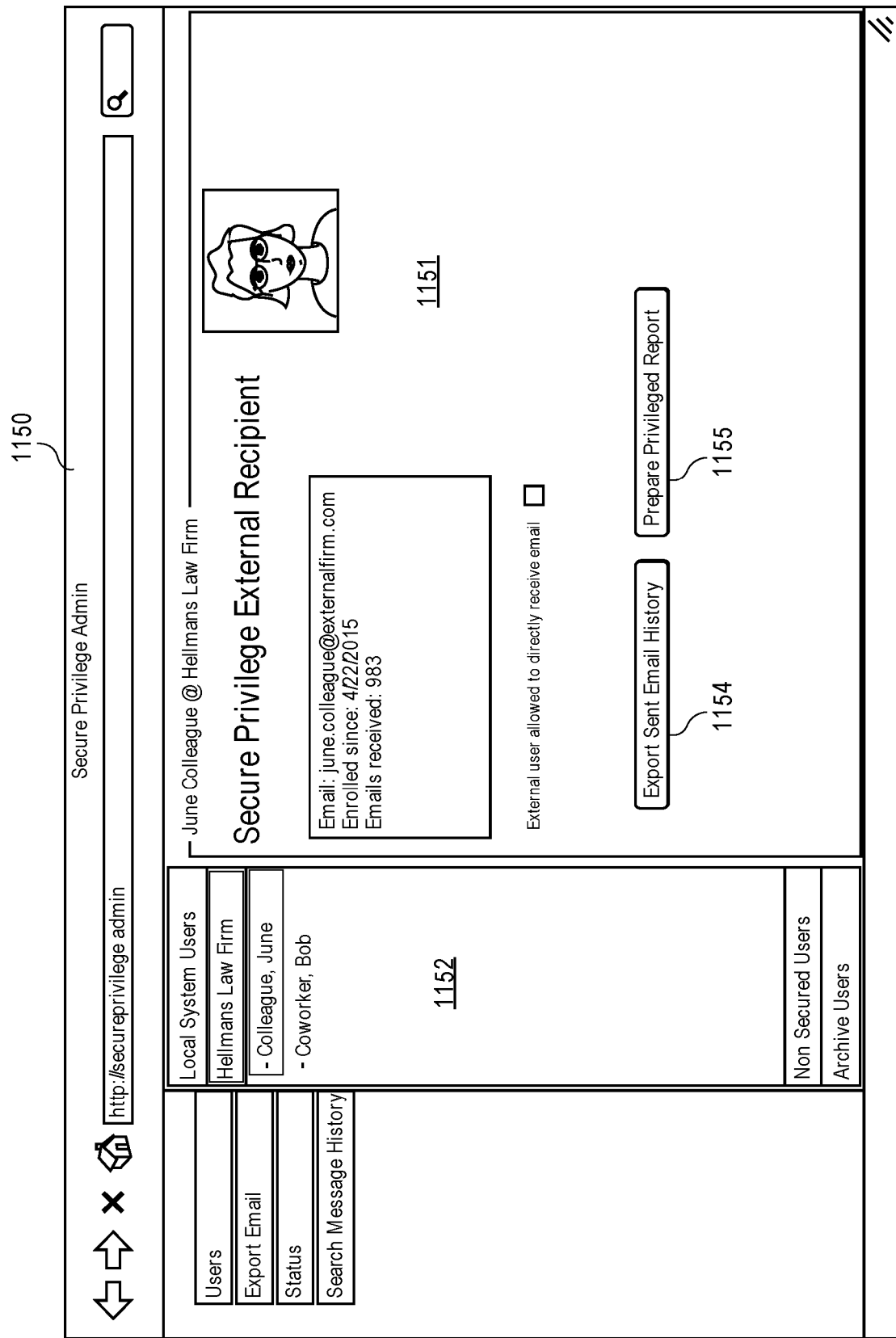

FIG. 11 illustrates an interface 1150 associated with accessing and viewing information associated with an external user, where the interface 1150 may be accessed by an administrator or other user of a communication platform. The interface 1150 includes a user selection area 1152 that lists external users who are authorized or registered to receive communications having certain designations. For example, the external users may be authorized to receive privileged emails. The user selection area 1152 enables the administrator to select the users for more information. As shown in FIG. 11, the administrator has selected June Colleague.

After the administrator selects a user, the interface 1150 may display an information section 1151 associated with the selected user. The information section 1151 may include information such as a name, email address, photo, and/or other information. The information section 1151 may further includes an export sent email selection 1154 that, upon selection, causes the communication application to export emails that are sent to the selected user, and a prepare privileged report selection 1155 that, upon selection, causes the communication application to prepare a report detailing any privileged communications prepared or received by the selected user.

FIGS. 12A-12K illustrate additional exemplary interfaces associated with the present embodiments. One or more electronic devices (e.g., a computer, a mobile device, etc.) may be configured to display the interfaces and/or receive selections and inputs via the interfaces, where the electronic device(s) may be associated with a user or administrator of a communication application or platform. For example, an email application or platform that is configured to operate on the electronic device may display the interfaces. It should be appreciated that the interfaces are merely exemplary and that alternative or additional content is envisioned.

Figure 12A:
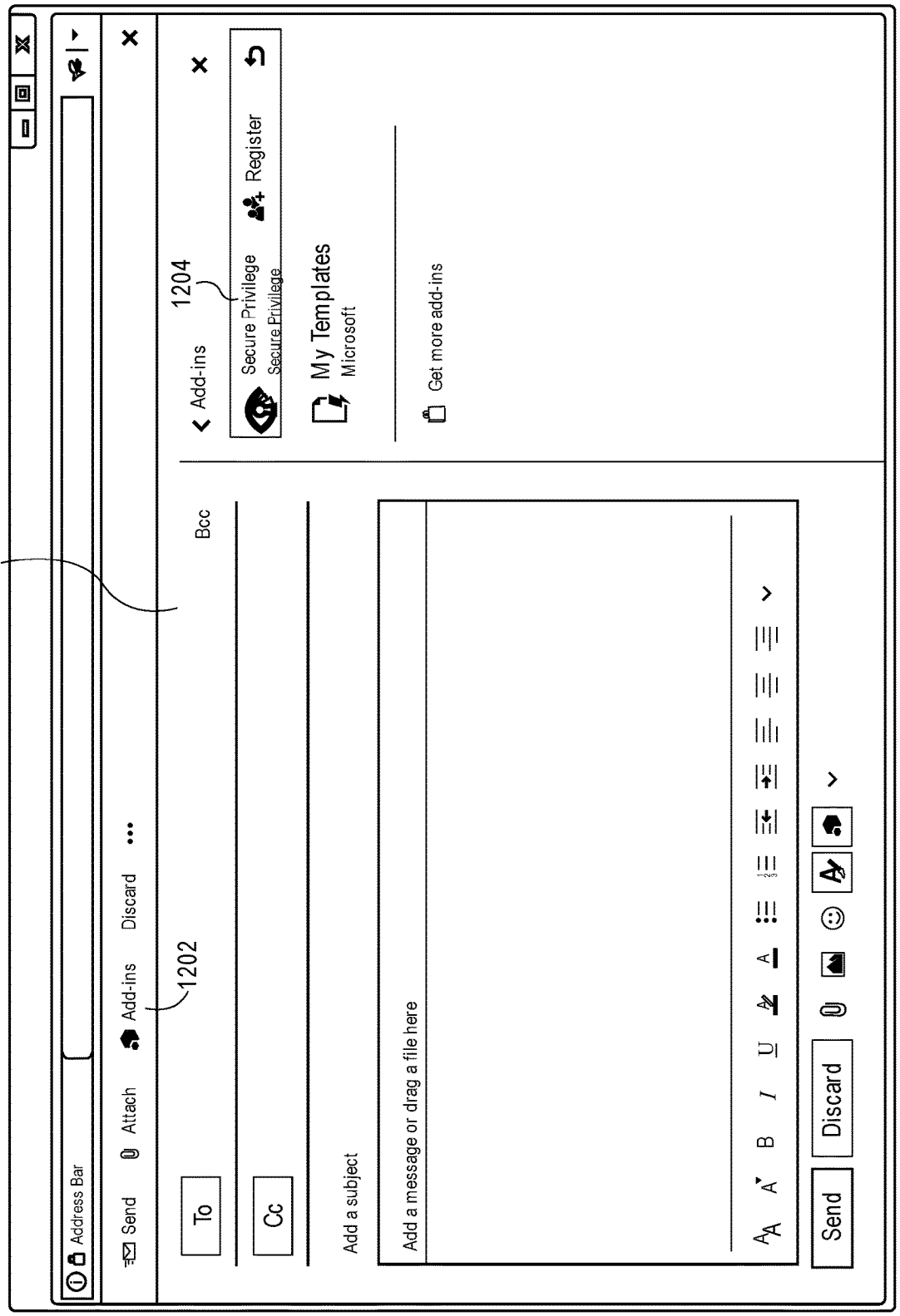

FIG. 12A illustrates an interface 1200 associated with selecting and activating a communication designation application, add-in, plug-in, extension, or the like, which may execute within the communication application or platform. The interface 1200 may include a selection 1202 that may cause the communication application to display a listing of add-ins. One particular add-in as displayed in the interface 1200 is a secure privilege selection 1204 that may activate, install, and/or initiate an add-in that enables the designation of electronic communications.

Figure 12B:
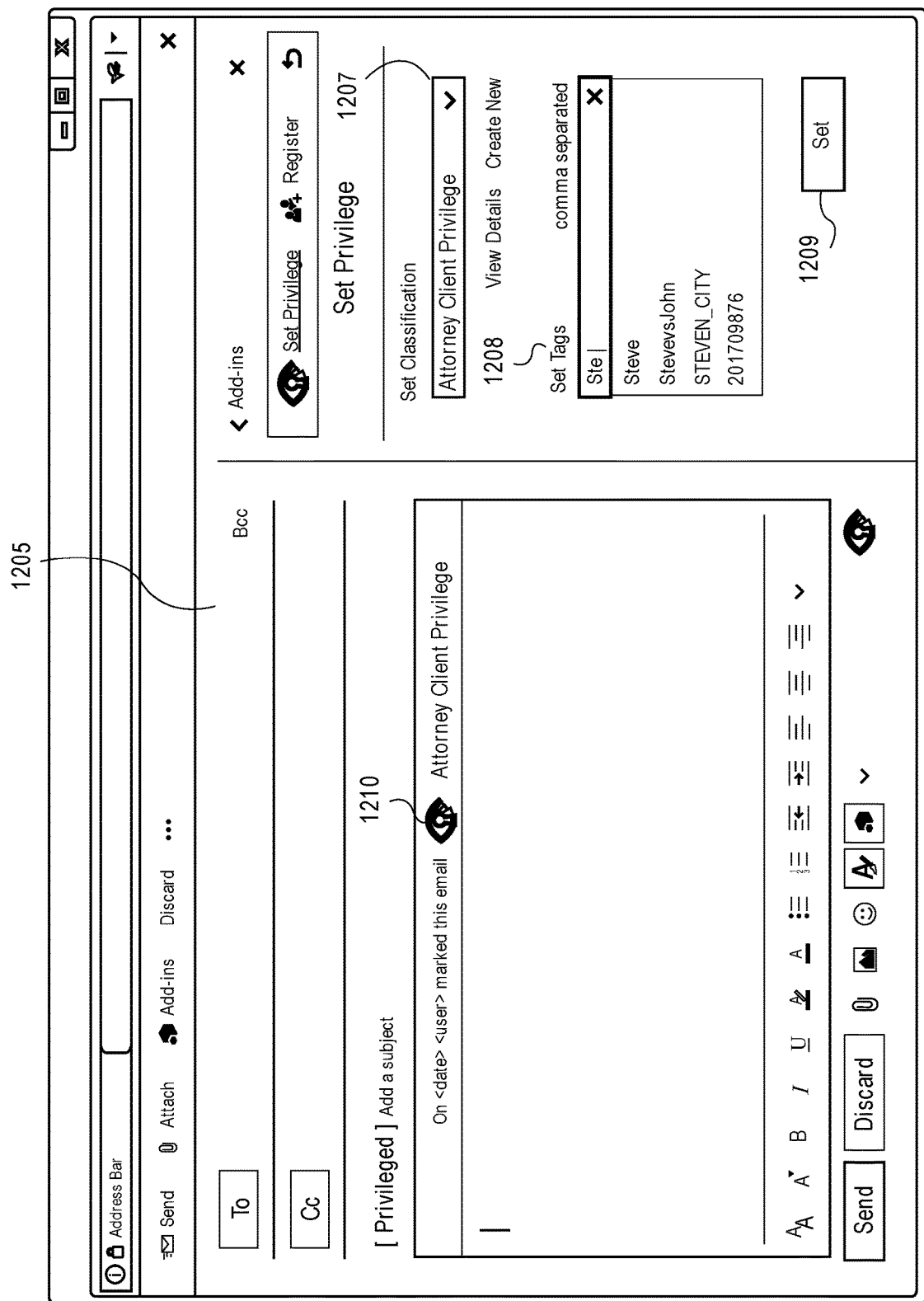

FIG. 12B illustrates an interface 1205 associated with designating an electronic communication (as shown: an email). The interface 1205 may include a selection 1207 that enables a user to select a designation for an email (as shown: "Attorney Client Privilege"). It should be appreciated that the user may select an alternative designation for the email, for example from a drop-down menu. The user may also input a set of tags for the email via a set tag input 1208, where the set of tags may further organize or group emails. In particular, emails with a common tag may be grouped and retrieved as a set or group. The user may select a set selection 1209 to cause the email to be designated with the designation selected via 1207. A window in the interface 1205 may display an indication 1210 of the email designation (as shown: Attorney Client Privilege).

Figure 12C:
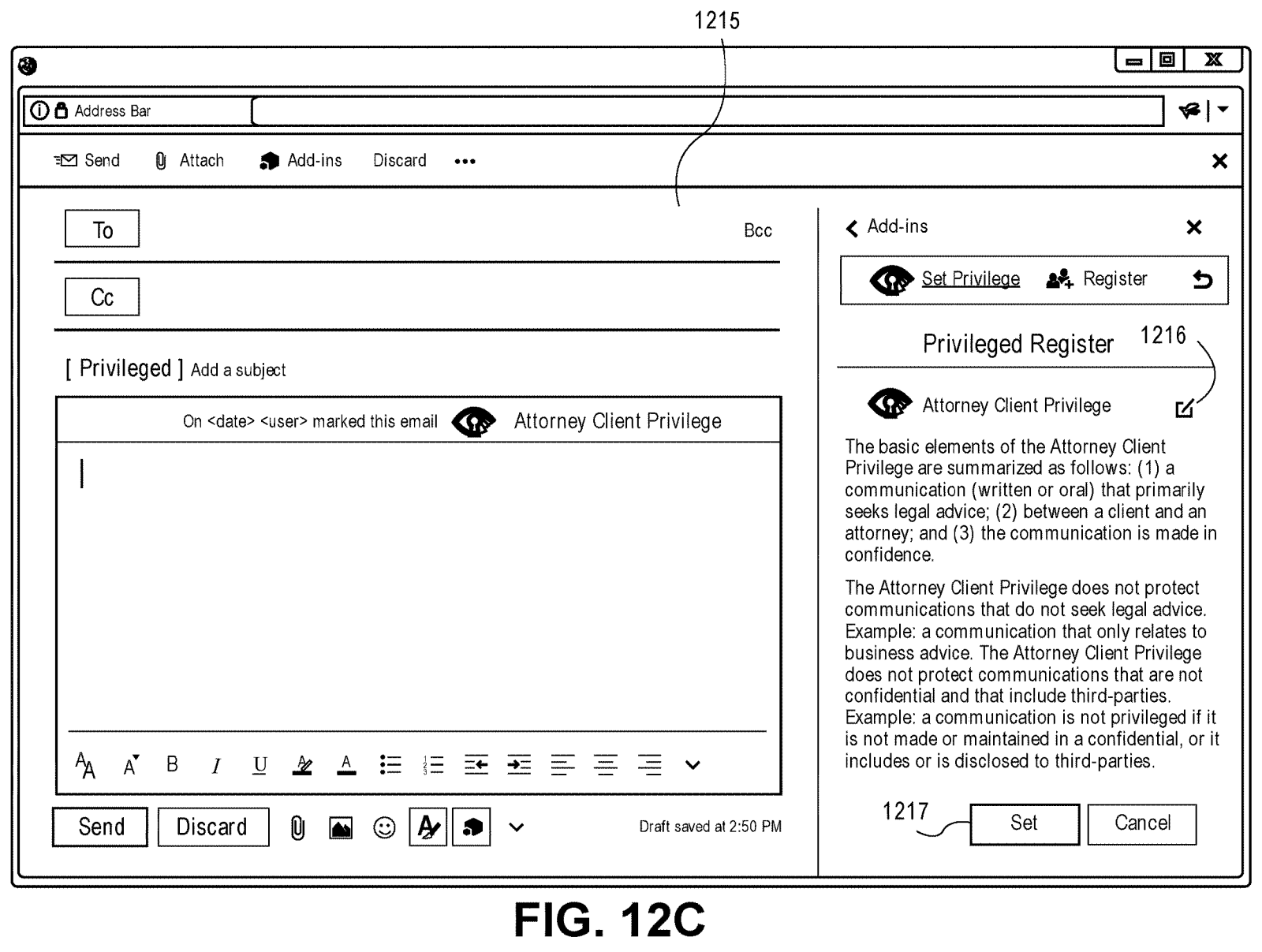

FIG. 12C illustrates an additional interface 1215 associated with designating an electronic communication (as shown: an email). The interface 1215 may include a description of the selected designation (as shown: Attorney Client Privilege). In embodiments, the description may be included in the body portion or in metadata of the resulting email. The interface 1215 may further include an edit selection 1216 that may enable a user to edit the description of the selected designation. Further, the interface 1215 may include a set selection 1217 that may save the inputted description of the selected designation.

Figure 12D:
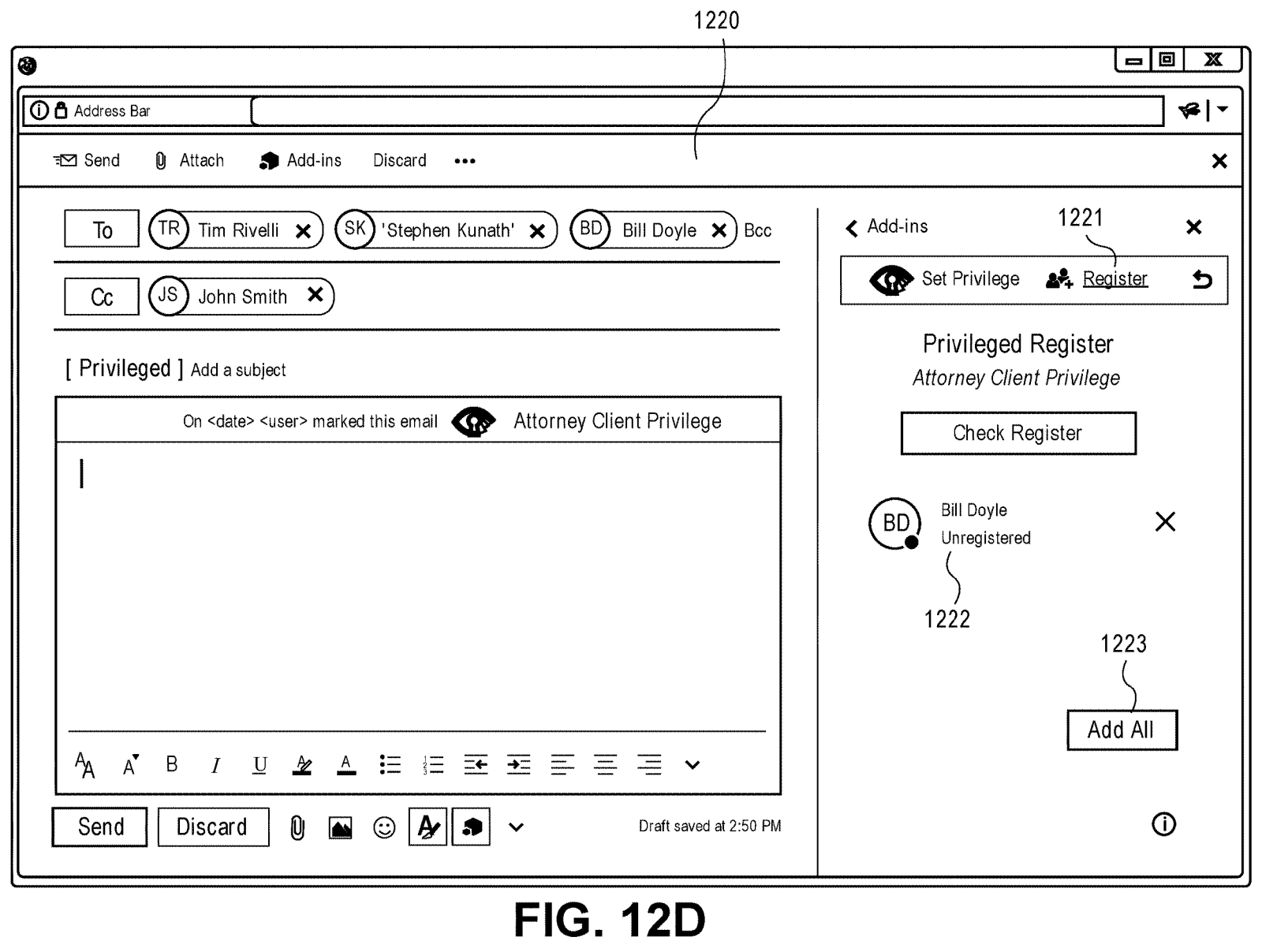

FIG. 12D illustrates an interface 1220 associated with determining registration statuses of users. In embodiments, a user may compose a communication (as shown: an email) and designate a set of recipients for the communication. The user may further select a register selection 1221 that, upon selection, may check the registration status(es) of the designated recipient(s) for the communication. In embodiments, the interface 1220 may indicate (1222) any of the recipient(s) who are not registered with the application (as shown: Bill Doyle is unregistered). The interface 1223 may further include an add selection 1223 that may cause any of the unregistered recipient(s) to be registered with the application.

Figure 12E:
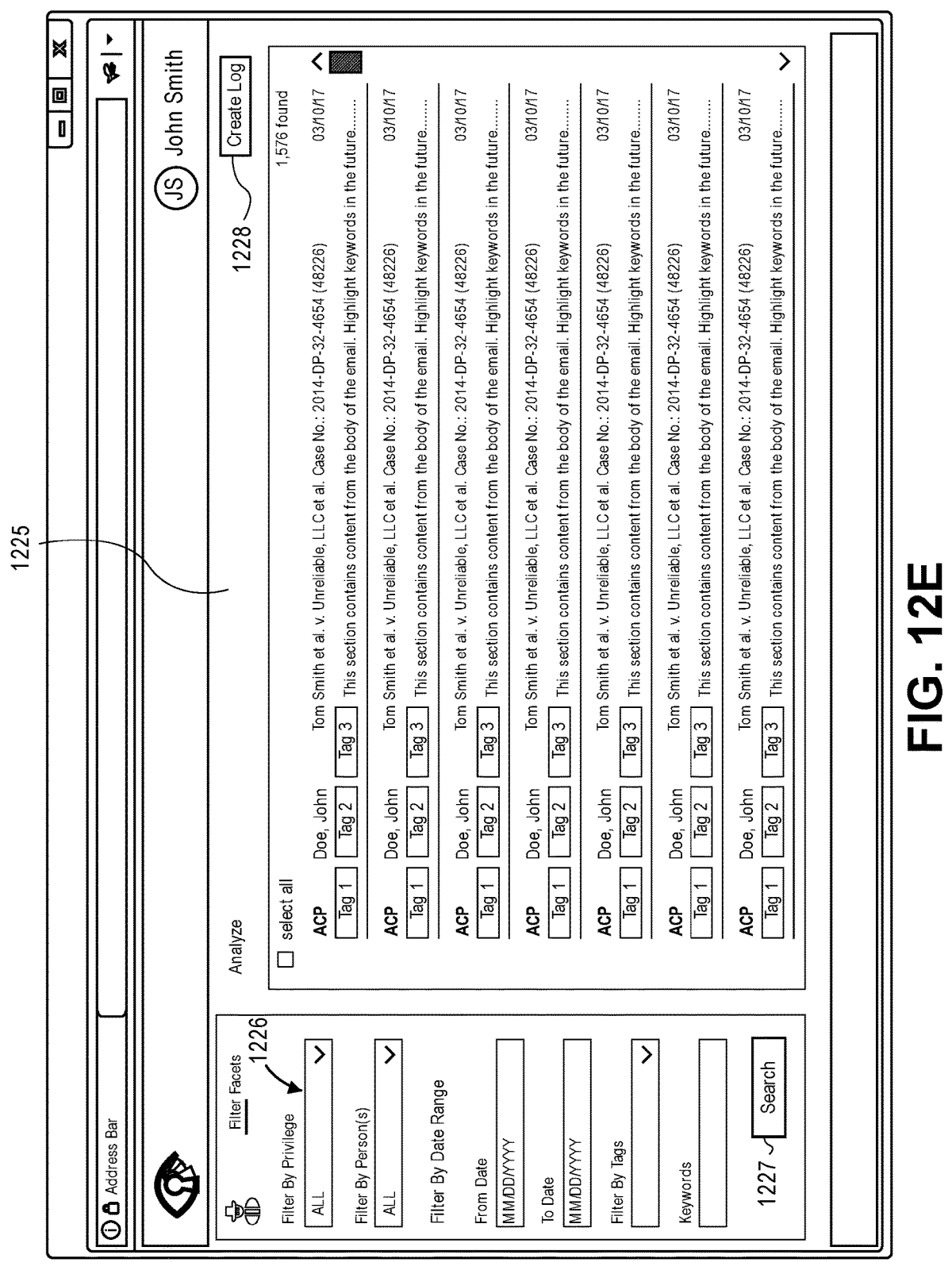

FIG. 12E illustrates an interface 1225 associated with creating and retrieving a log of electronic communications. The interface 1225 includes a set of filters 1226 that may be selected or filled out by a user. According to embodiments, the user may filter electronic communications by designated privilege (e.g., Attorney Client Privilege), by person(s) (i.e., who sent or received the electronic communications), by date range, by tags, and/or by other filters. Additionally, the user may search for electronic communications by keywords included in the electronic communications.

After the user enters a filter(s), the user may select a search selection 1227 that causes a search for a set of electronic communications according to the entered filter(s). After the search is performed, the interface 1225 may display a set of search results including a set of electronic communications that match the entered filter(s). The interface 1225 may further include a create log selection 1228 that may cause a log including the search results to be generated, where the log may be accessed and reviewed as needed.

Figure 12F:
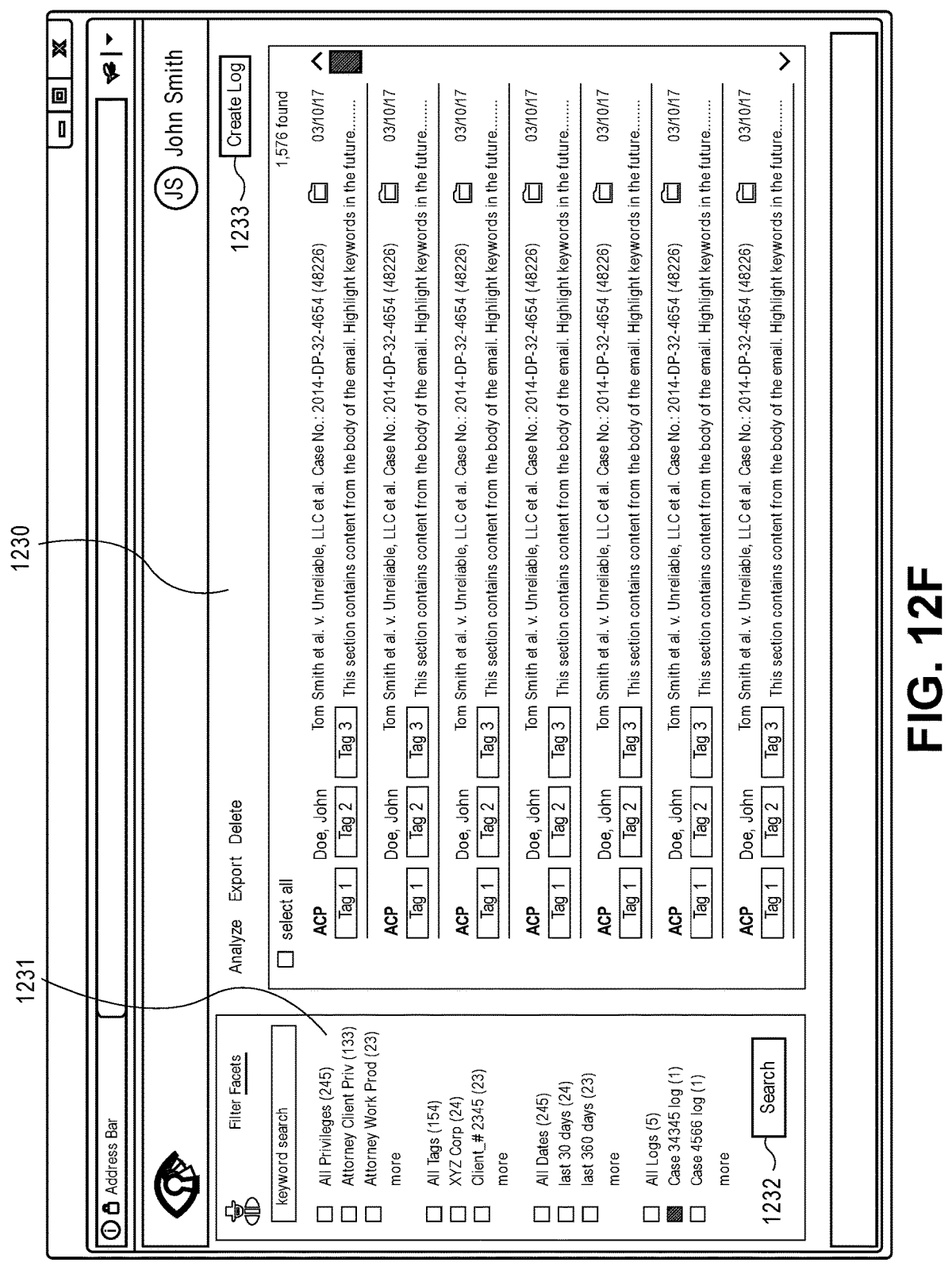

FIG. 12F illustrates an alternate interface 1230 associated with creating and retrieving a log of electronic communications. The interface 1230 may include a set of selections 1231 that may be selected or filled out by a user. In contrast to the set of filters 1226 of FIG. 12E, the set of selections 1231 may identify specific selections that may be selected by a user to filter electronic communications.

After the user enters a selection(s), the user may select a search selection 1232 that causes a search for a set of electronic communications according to the entered selection(s). After the search is performed, the interface 1230 may display a set of search results including a set of electronic communications that match the entered selection(s). The interface 1230 may further include a create log selection 1233 that may cause a log including the search results to be generated, where the log may be accessed and reviewed as needed.

Figure 12G:
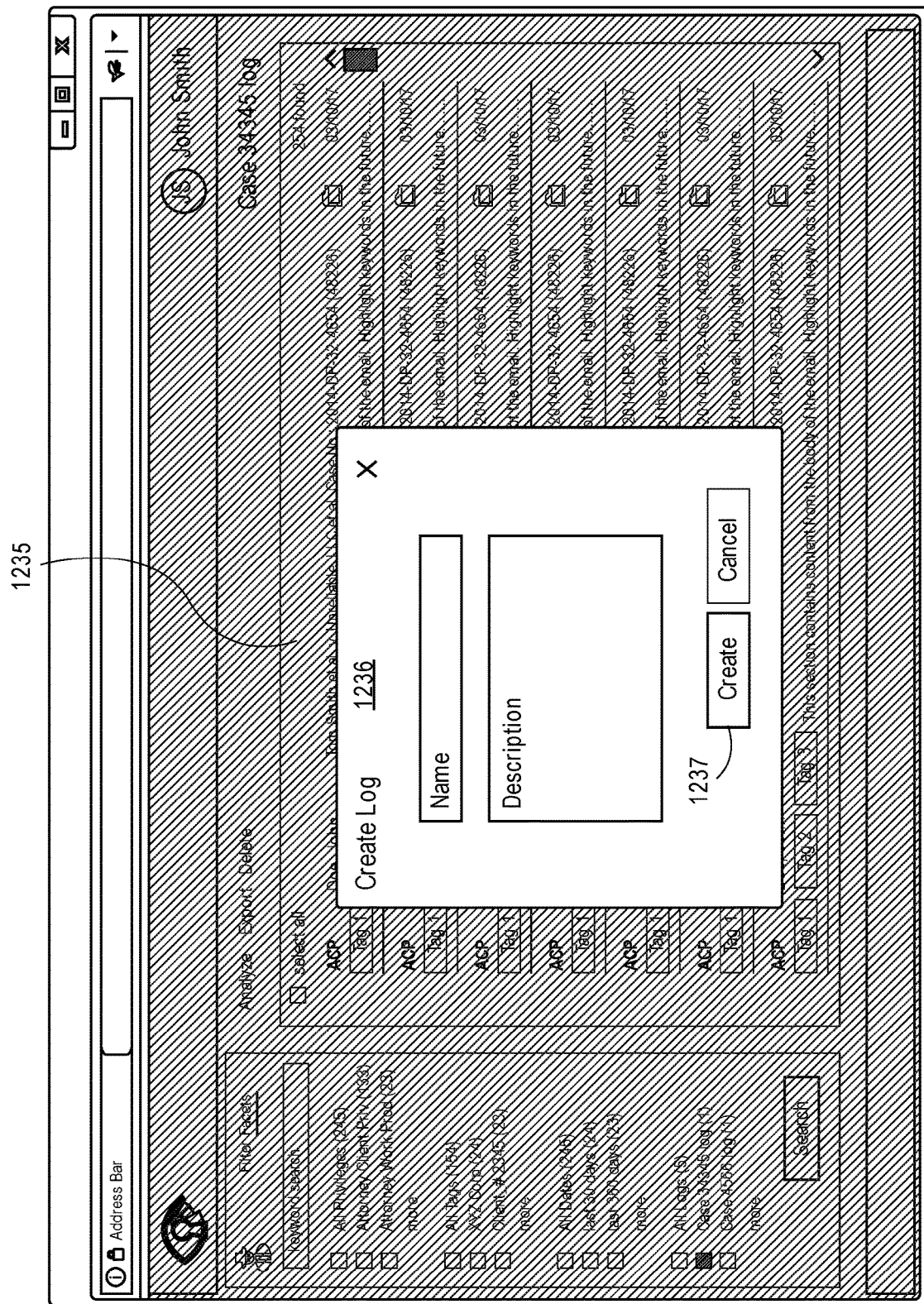

FIG. 12G illustrates an interface 1235 associated with creating a log of electronic communications. According to embodiments, the application may display the interface 1235 in response to the user selecting either of the respective create log selections 1228, 1233 of FIGS. 12E and 12F. The interface 1235 may include a window 1236 into which the user may specify a name for the log and a description for the log. In response to the user selecting a create selection 1237, the application may accordingly generate the log.

Figure 12H:
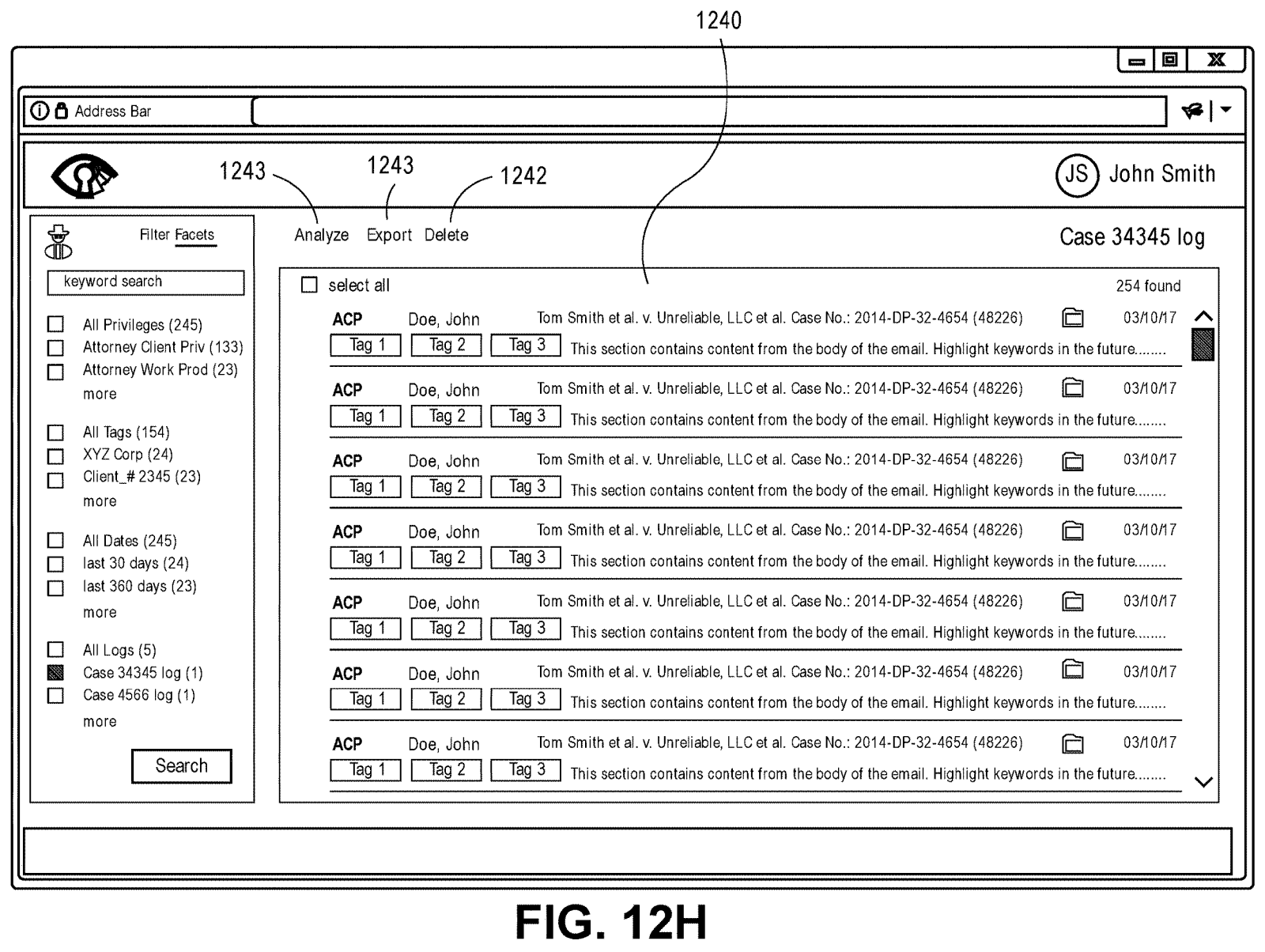

FIG. 12H illustrates an interface 1240 associated with a log review. The interface 1240 may display contents (e.g., electronic communications) of a created log. The interface 1240 may include an analyze selection 1243 that causes the created log to be analyzed. For example, an analysis of the log may generate visualizations, determine patterns, identify relevant communications, and/or determine other results or metrics. The interface 1240 may also include an export selection 1242 that may cause the created log to be exported as a certain type of file to an inputted destination. Additionally, the interface 1240 may include a delete selection 1241 that may cause the created log to be deleted.

Figure 12I:
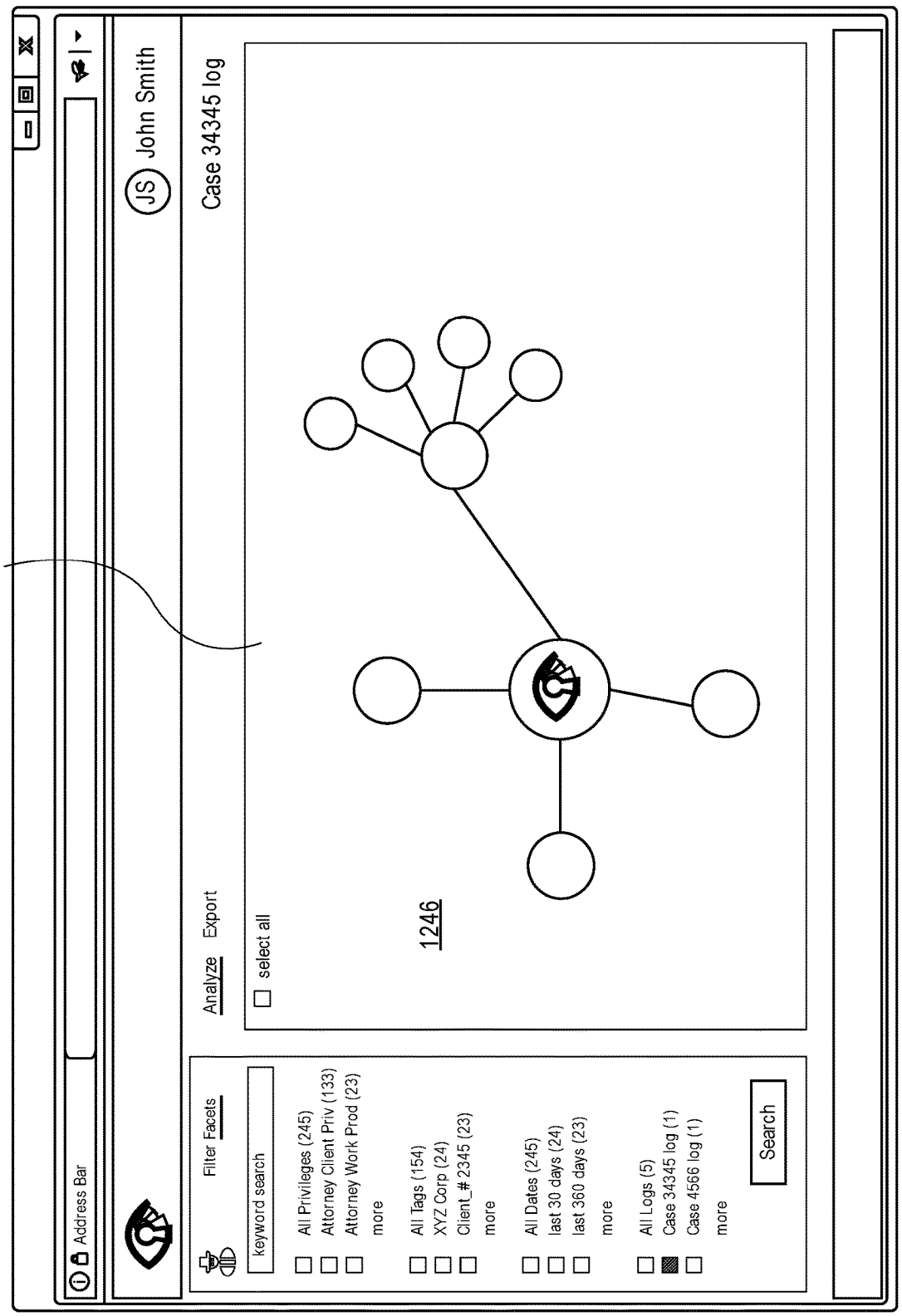

FIG. 12I illustrates an interface 1245 associated with a log analysis. In embodiments, the application may display the interface 1245 in response to a selection of the analysis selection 1243 of FIG. 12H. The interface 1245 may include a visualization 1246 of a created log, where the visualization may indicate, in a visual manner, a set of communication participants (e.g., senders and recipients) as well as a set of events (e.g., which senders sent which electronic communications to which recipients). It should be appreciated that other types of visualizations are envisioned.

Figure 12J:
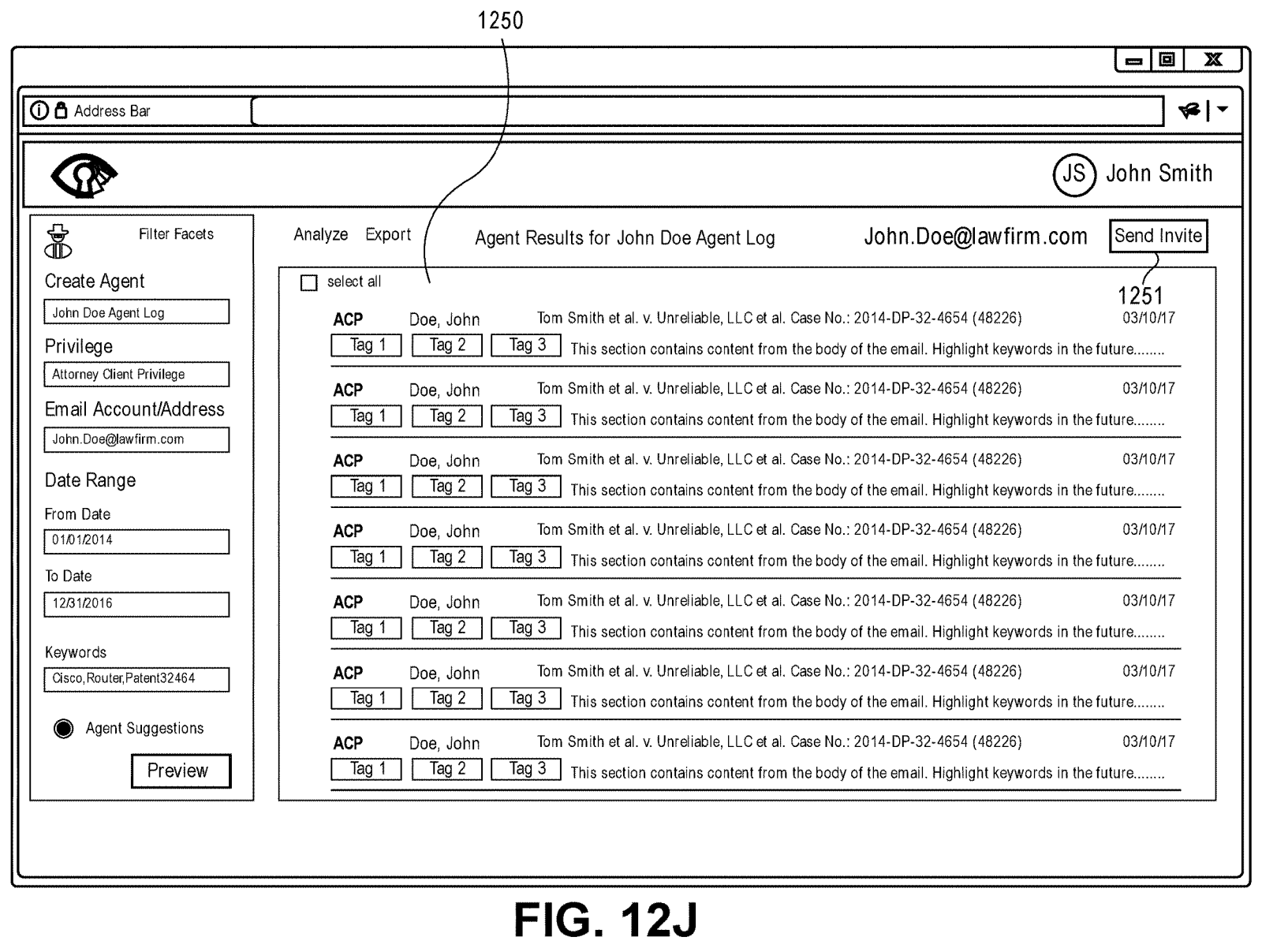

FIG. 12J illustrates an interface 1250 associated with searching for and classifying electronic communications. In embodiments, the interface 1250 may be accessible by an administrator or otherwise an individual with privileges to classify or designate communications. The interface 1250 may enable the administrator to search for electronic communications without a designation, where the interface 1250 may display indications of the electronic communications.

The interface 1250 may include an invite selection 1251 that causes a notification to be sent to a user associated with a selected communication (e.g., a sender and/or recipient of the communication) along with a designation recommendation, where the user may select to approve or deny the designation recommendation. If the user selects to approve the designation recommendation, the selected communication may be designated accordingly. If the user selects to deny the designation recommendation, the selected communication may remain as-is. For example, the administrator may identify an electronic communication that the administrator determines should be designated as Attorney Client Privilege. By the administrator selecting the invite selection 1251, the application may send a notification to the sending user of the electronic communication with a recommendation that the electronic communication be designated as Attorney Client Privilege, where the sending user may select to approve or deny.

In an implementation, the application may automatically review electronic communications and determine designation recommendations for the electronic communications. Further, the application may automatically send designation recommendations to users for approval or denial.

Figure 12K:
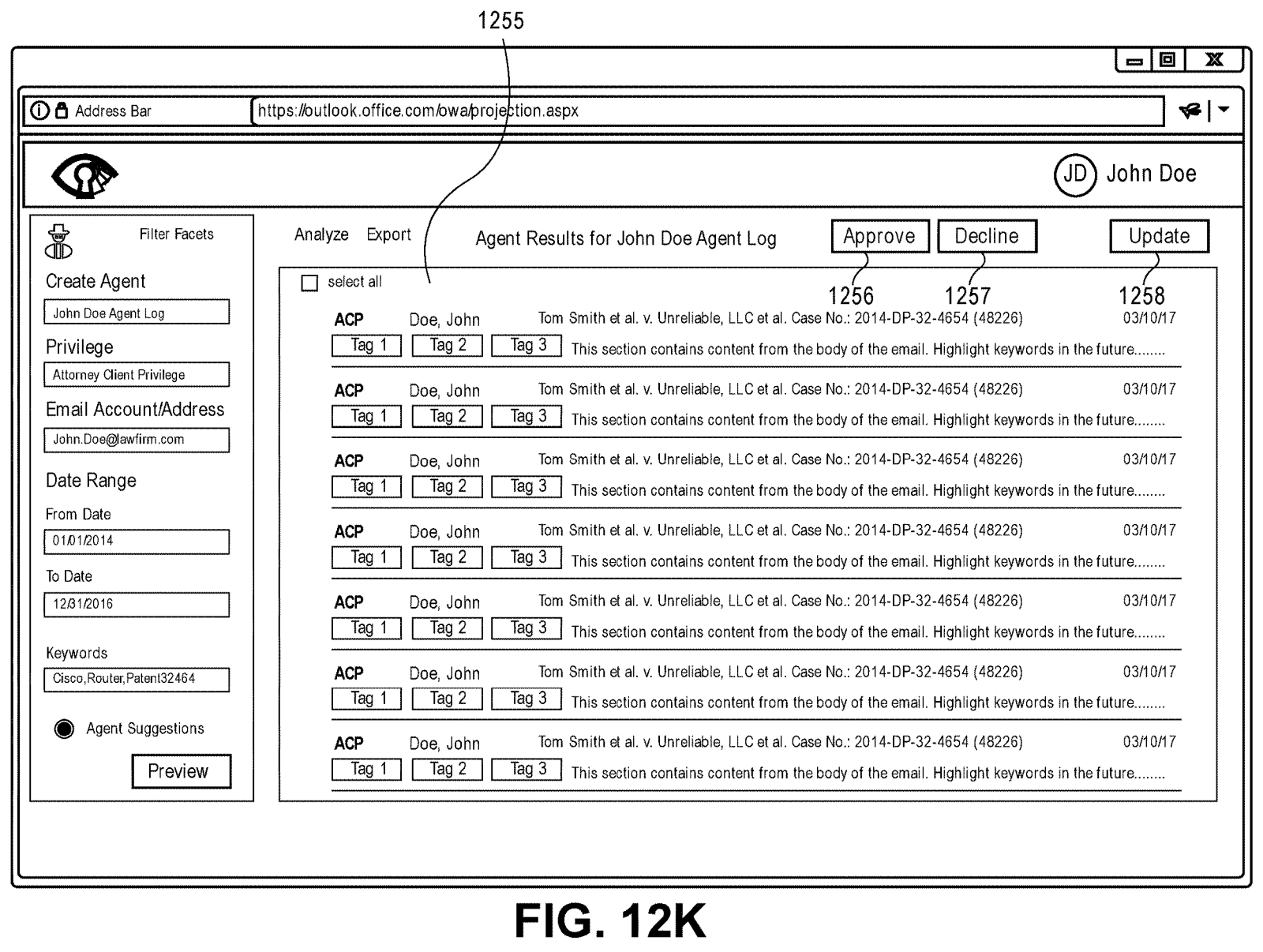

FIG. 12K illustrates an interface 1255 associated with reviewing a designation recommendation for an electronic communications. In embodiments, the interface 1255 may be accessible by a user who receives a designation recommendation from an administrator, as discussed with respect to FIG. 12J. The user may select to approve a designation recommendation via an approve selection 1256, or decline a designation recommendation via a decline selection 1257. Additionally, the user may select an update selection 1258 to cause electronic communications to be updated according to their new designations. In an implementation, the application itself may automatically approve or decline a designation recommendation without user interaction.

Figure 13:
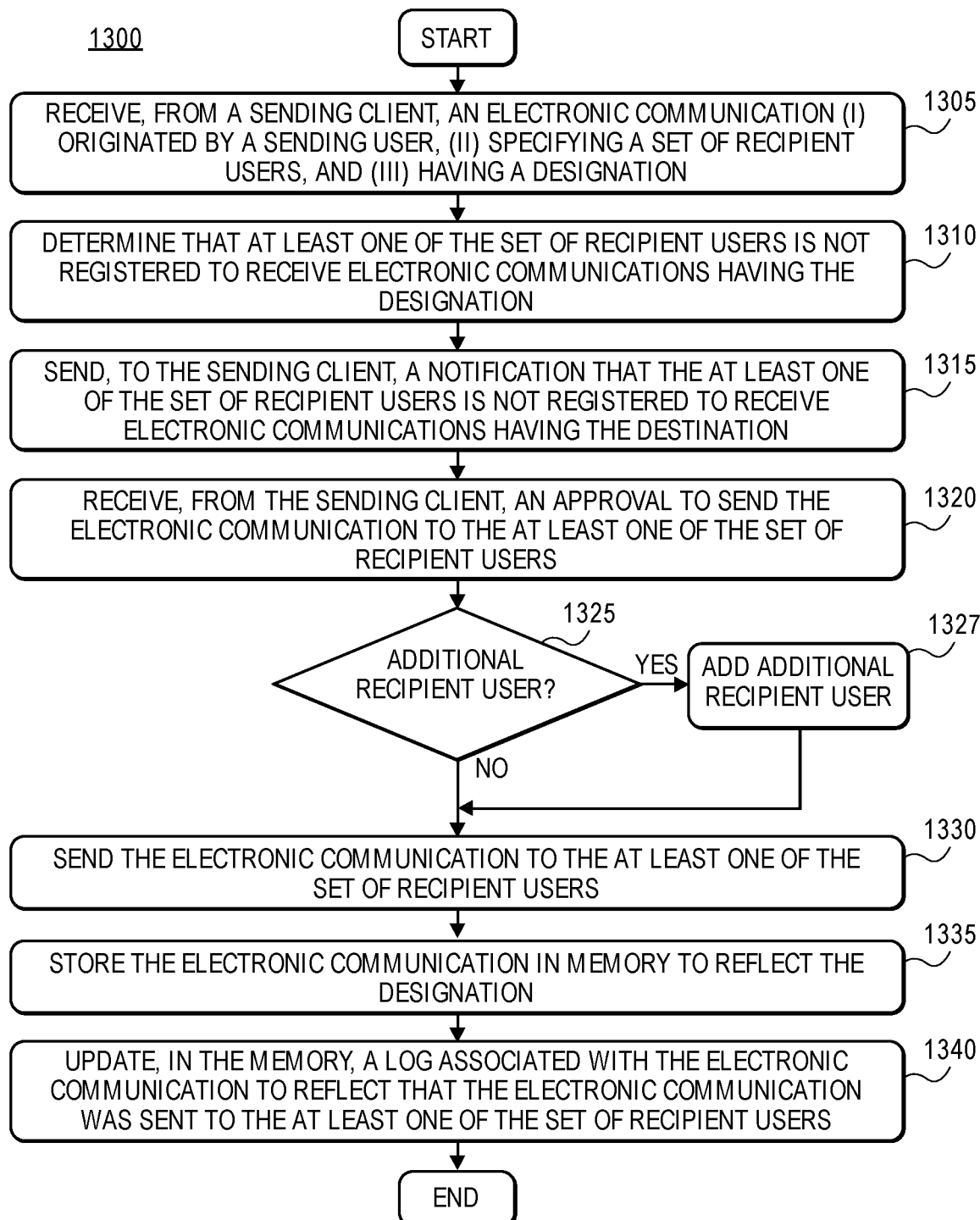
FIG. 13 depicts a flow chart of an exemplary method of managing electronic communications, in accordance with some embodiments.

FIG. 13 depicts a block diagram of an exemplary computer-implemented method 1300 of managing electronic communications. The method 1300 may be facilitated by a server (such as the email server 205 as discussed with respect to FIG. 2) that may communicate with various clients that may participate in electronic communication transmission.

The method 1300 may begin when the server receives (block 1305), from a sending client, an electronic communication (i) originated by a sending user, (ii) specifying a set of recipient users, and (iii) having a designation. The server may determine (block 1310) that at least one of the set of recipient users is not registered to receive electronic communications having the designation. In embodiments, the server may access a user register that stores a set of authorizations for the set of recipient users, and may determine, from the set of authorizations included in the user register, that the at least one of the set of recipient users is not registered to receive electronic communications having the designation. It should be appreciated that the server may determine whether any of the set of recipient users is registered or not registered according to other techniques.

The server may send (block 1315), to the sending client, a notification that the at least one of the set of recipient users is not registered to receive electronic communications having the designation. In embodiments, the sending client may prompt a user (i.e., the sending user) for approval to send the electronic communication to the at least one of the set of recipient users, where the user may approve or reject sending the electronic communication.

The server may receive (block 1320), from the sending client, an approval to send the electronic communication to the at least one of the set of recipient users. In embodiments, the approval indicates that the user of the sending client has approved sending the electronic communication. The server may determine (block 1325) whether the electronic communication specifies an additional recipient user. If the electronic communication does not specify an additional recipient user ("NO"), processing may proceed to block 1330. If the electronic communication does specify an additional recipient user ("YES"), the server may add (block 1327) the additional recipient user or otherwise include the additional recipient user for receipt of the electronic communication. In embodiments, the server may request and receive approval from the sending client to send the electronic communication to the additional recipient user.

At block 1330, the server may send the electronic communication to the at least one of the set of recipient users. Additionally, if an additional recipient user is specified, the server may send, either before, concurrently with, or after sending the electronic communication to the at least one of the set of recipient users, the electronic communication to the additional recipient user. In embodiments, the server may send the electronic communication to a receiver client associated with the at least one of the set of recipient users.

The server may store (block 1335) the electronic communication in memory to reflect the designation. Additionally or alternatively, the server may update (block 1340), in the memory, a log associated with the electronic communication to reflect that the electronic communication was sent to the at least one of the set of recipient users. Accordingly, an administrator or other individual may subsequently access the log to review the electronic communication and activity thereof.

Figure 14:
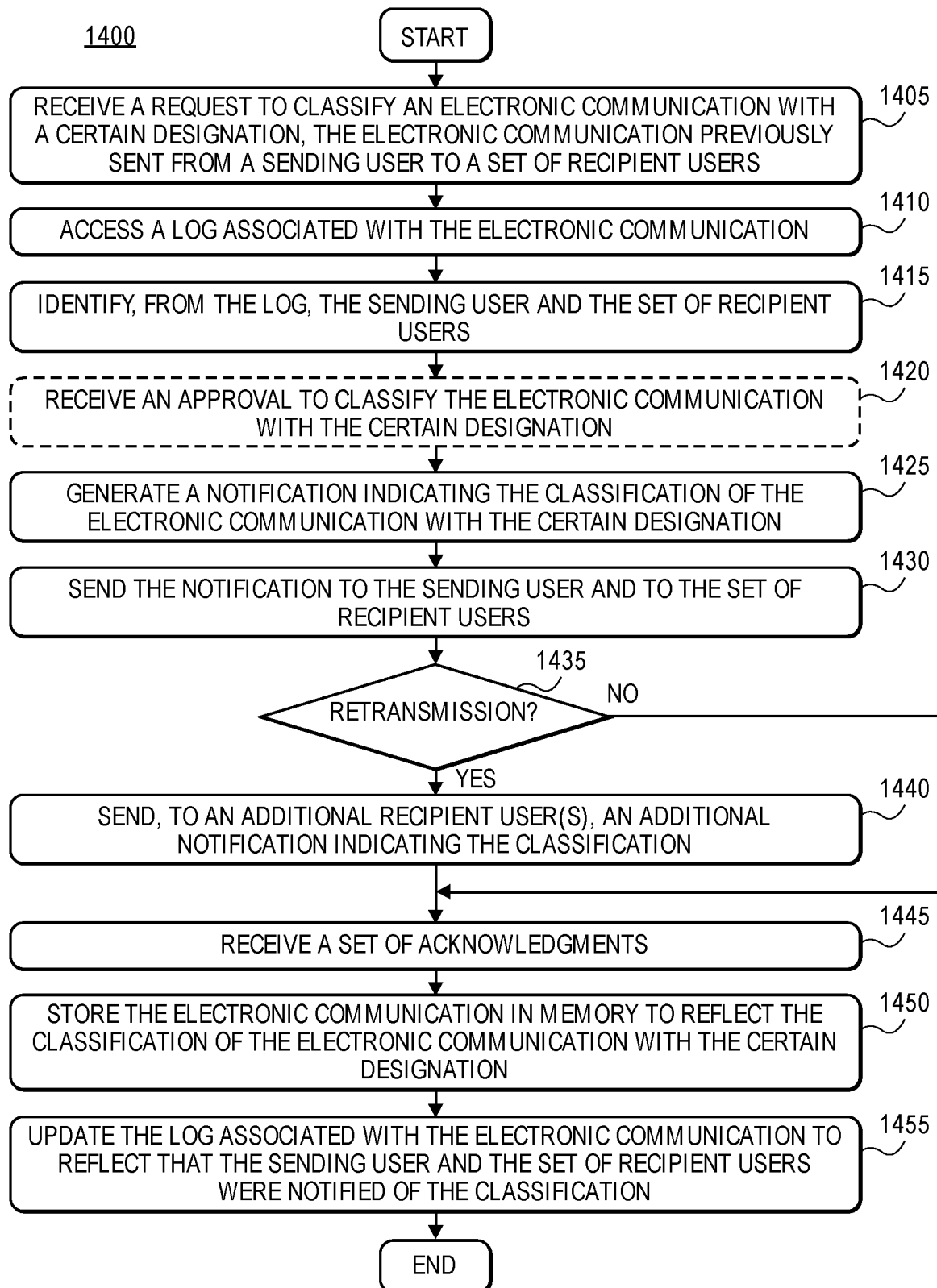
FIG. 14 depicts a flow chart of another exemplary method of managing electronic communications, in accordance with some embodiments.

FIG. 14 depicts a block diagram of an exemplary computer-implemented method 1400 of managing electronic communications. The method 1400 may be facilitated by a server (such as the email server 305 as discussed with respect to FIG. 3) that may communicate with various clients that may participate in electronic communication transmission.

The method 1400 may begin when the server receives (block 1405) a request to classify an electronic communication with a certain designation, where the electronic communication was previously sent from a sending user to a set of recipient users. In embodiments, the request may specify all or a portion of the electronic communication to classify with the certain designation. The server may access (block 410) a log associated with the electronic communication, where the log may indicate a transmission history of the electronic communication. The server may identify (block 415), from the log, the sending user and the set of recipient users.

In an optional implementation, the server may receive (block 1420) an approval to classify the electronic communication with the certain designation. In embodiments, the approval may be from an administrator associated with the server or from the sending user (e.g., via a client of the sending user). In embodiments, if the approval is not received (or a denial is received), processing may end, repeat, or proceed to other functionality.

The server may generate (block 1425) a notification indicating the classification of the electronic communication with the certain designation. In embodiments, the notification may be the same format as the electronic communication (e.g., an email), and may identify the certain designation and describe any implications thereof. The server may send (block 1430) the notification to the sending user and to the set of recipient users.

The server may determine (block 1435) whether the electronic communication was retransmitted (e.g., forwarded), such as by the sending user or by one or more of the set of recipient users. If the electronic communication was not retransmitted ("NO"), processing may proceed to block 1445. If the electronic communication was retransmitted ("YES"), the server may send (block 1440), to an additional recipient user(s), an additional notification indicating the classification. In embodiments, the additional recipient user(s) may represent the user(s) who received the retransmission of the electronic communication, where the additional notification may be the same as or different from the notification sent in block 1430.

The server may receive (block 1445) a set of acknowledgements from each of the sending user and any of the recipient user(s) and additional recipient user(s) who received the notification, where the set of acknowledgements may indicate that the respective user received the notification.

The server may store (block 1450) the electronic communication in memory to reflect the classification of the electronic communication with the certain designation. Additionally or alternatively, the server may update (block 1455), in the memory, a log associated with the electronic communication to reflect that the sending user and the set of recipient users (and any additional recipient user(s)) were notified of the classification. Accordingly, an administrator or other individual may subsequently access the log to review the electronic communication and activity thereof.

Figure 15:
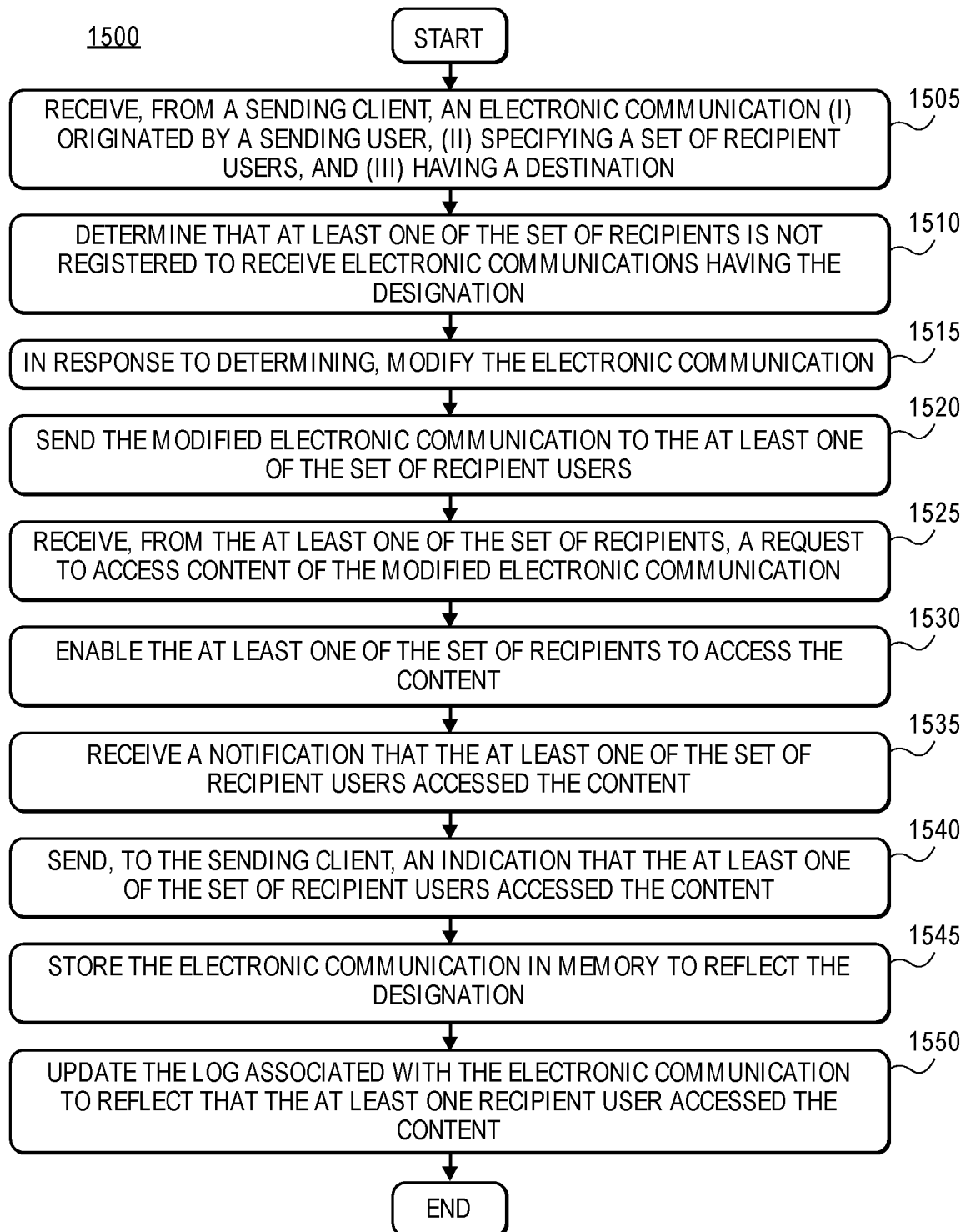
FIG. 15 depicts a flow chart of another exemplary method of managing electronic communications, in accordance with some embodiments.

FIG. 15 depicts a block diagram of an exemplary computer-implemented method 1500 of managing electronic communications. The method 1500 may be facilitated by a server (such as the email server 405 as discussed with respect to FIG. 4) that may communicate with various clients that may participate in electronic communication transmission.

The method 1500 may begin when the server receives (block 1505), from a sending client, an electronic communication (i) originated by a sending user, (ii) specifying a set of recipient users, and (iii) having a designation. The server may determine (block 1510) that at least one of the set of recipients is not registered to receive electronic communications having the designation. In embodiments, the server may access a register or similar data record to make the determination.

In response to the determination, the server may modify (block 1515) the electronic communication. In embodiments, the server may replace all or some of the content included in the electronic communication with a link (or other type of selection), where the link may be selectable by the at least one of the set of recipient users. In effect, the link may substitute for some or all of the replaced content, where the link may direct its accessing user to some or all of the replaced content. In an implementation, the server may host a website that may include the replaced content and may enable the accessing user to access the replace content. The server may automatically determine which of the content to replace based on one or more factors or parameters. Additionally or alternatively, the server may remove any attachment or document originally included with the electronic communication.

The server may send (block 1520) the modified electronic communication to the at least one of the set of recipient users, where the at least one of the set of recipient users may select the link to request to access the content. Accordingly, the server may receive (block 1525), from the at least one of the set of recipients, a request to access content of the modified electronic communication. In embodiments, the receipt of the request may be in response to the at least one of the set of recipients selecting the link.

The server may enable (block 1530) the at least one of the set of recipients to access the content. In an embodiments, the server may retrieve login credentials of the at least one of the set of recipient users, and may enable access to the content based on the login credentials. Generally, to enable access to the content, the server may provide or otherwise avail the content to the at least one of the set of recipients.

The server may receive (block 1535) a notification that the at least one of the set of recipient users accessed the content. Additionally, the server may send (block 1540), to the sending client, an indication that the at least one of the set of recipient users accessed the content. Accordingly, the sending user may be notified that at least one of the set of recipient users accessed the content.

The server may store (block 1545) the electronic communication in memory to reflect the designation. Additionally or alternatively, the server may update (block 1550), in the memory, a log associated with the electronic communication to reflect that the at least one of the recipient users accessed the content. Accordingly, an administrator or other individual may subsequently access the log to review the electronic communication and activity thereof.

Figure 16:
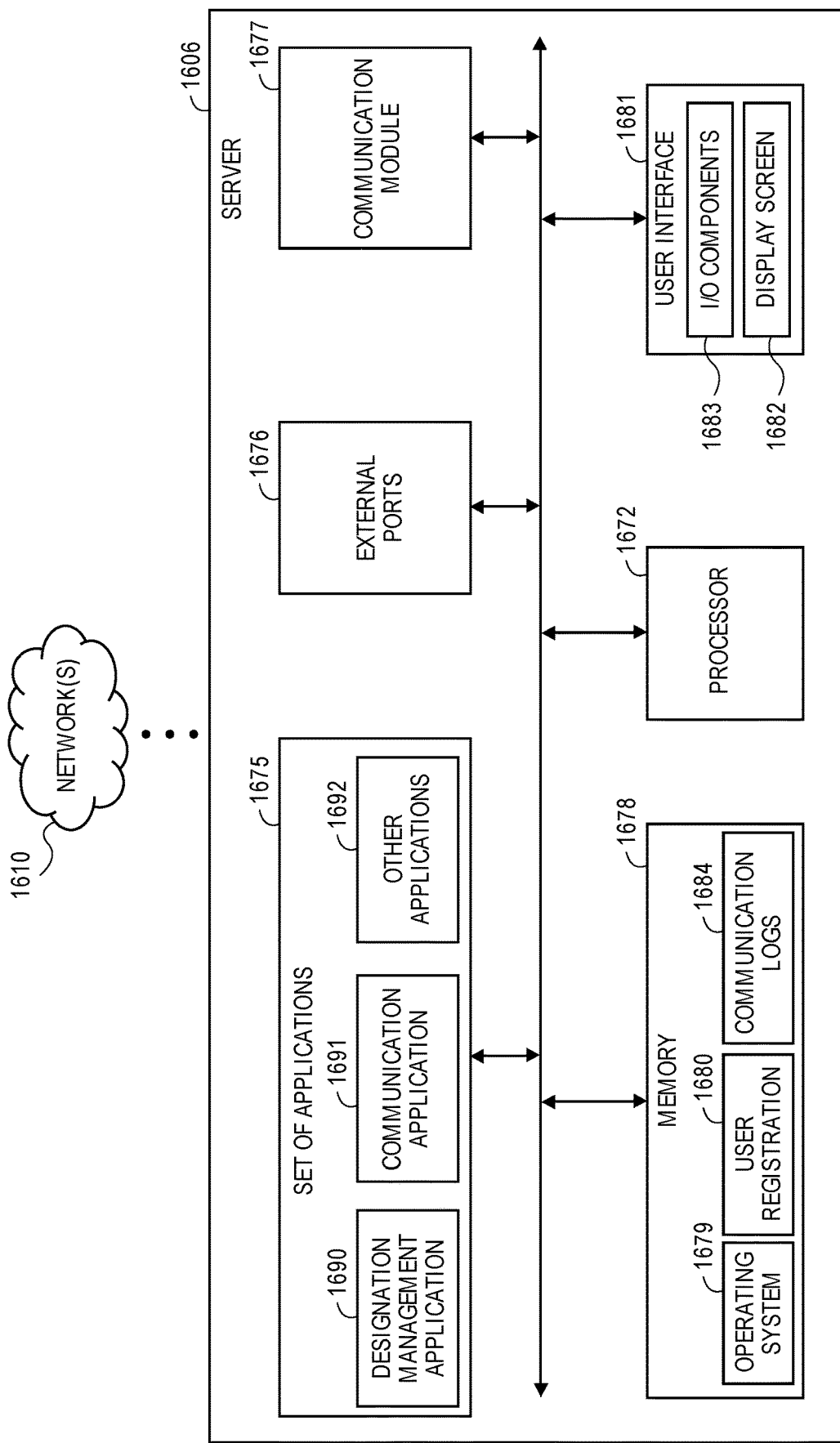
FIG. 16 is a block diagram of another exemplary server, in accordance with some embodiments.

FIG. 16 illustrates a diagram of an exemplary server 1606 (such as the email server 105 as discussed with respect to FIG. 1) in which the functionalities as discussed herein may be implemented. It should be appreciated that the server 1606 may be configured to be connect to and communicate with various entities, components, and devices, as discussed herein.

The server 1606 may include a processor 1672 as well as a memory 1678. The memory 1678 may store an operating system 1679 capable of facilitating the functionalities as discussed herein as well as a set of applications 1675 (i.e., machine readable instructions). For example, one of the set of applications 1675 may be a designation management application 1690 configured to manage privileges and authorizations of users, and enable users and administrators to designate privileges and authorizations of users. Another of the set of applications 1675 may be a communication application 1691 configured to facilitate receipt and transmission of electronic communications. It should be appreciated that one or more other applications 1692 are envisioned.

The processor 1672 may interface with the memory 1678 to execute the operating system 1679 and the set of applications 1675. The memory 1678 may include a user register 1680 which may store privileges and authorizations of users, and communication logs 1684 which may indicate the activity of certain electronic communications. In an implementation, the designation management application 1690 may interface with the user register 1680 to access and modify certain information. Further, the communication application 1691 may retrieve one or more of the communication logs 1684 in response to a request.

The memory 1678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 1606 may further include a communication module 1677 configured to communicate data via one or more networks 1610. According to some embodiments, the communication module 1677 may include one or more transceivers (e.g., WWAN, WLAN, and/or WPAN transceivers) functioning in accordance with IEEE standards, 3GPP standards, or other standards, and configured to receive and transmit data via one or more external ports 1676. For example, the communication module 1677 may send receive, via the network 1610, electronic communications such as emails.

The server 1606 may further include a user interface 1681 configured to present information to a user and/or receive inputs from the user. As shown in FIG. 16, the user interface 1681 may include a display screen 1682 and I/O components 1683 (e.g., ports, capacitive or resistive touch sensitive input panels, keys, buttons, lights, LEDs). According to some embodiments, a user or administrator may access the server 1606 via the user interface 1681 to review information, make designations, and/or perform other functions.

In some embodiments, the server 1606 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 1672 (e.g., working in connection with the operating system 1679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method in an electronic communication server of managing electronic communications, the method comprising:

receiving, at the electronic communication server from a sending client separate from the electronic communication server, an electronic communication of a particular type (i) originated by a sending user of the sending client, (ii) specifying a set of recipient users, (iii) having a designation;

determining, by a computer processor of the electronic communication server, that at least one of the set of recipient users is not registered to receive electronic communications having the designation;

prior to the electronic communication server sending the electronic communication to the at least one of the set of recipient users, sending, from the electronic communication server to the sending client, an additional electronic communication of the particular type, the additional electronic communication indicating that the at least one of the set of recipient users is not registered to receive electronic communications having the designation, wherein the sending client prompts the sending user for approval to send the electronic communication to the at least one of the set of recipient users;

receiving, at the electronic communication server from the sending client, an approval to send the electronic communication to the at least one of the set of recipient users;

in response to receiving the approval to send the electronic communication, sending, by the electronic communication server, the electronic communication to the at least one of the set of recipient users, the electronic communication sent to the at least one of the set of recipient users indicating that the electronic communication that originated by the sending user originally had the designation; and storing the electronic communication in memory to reflect the designation.

2. The computer-implemented method of claim 1, further comprising:

updating, in the memory, a log associated with the electronic communication to reflect that the electronic communication was sent to the at least one of the set of recipient users.

3. The computer-implemented method of claim 1, further comprising:

determining that another one of the set of recipient users is registered to receive electronic communications having the designation; and sending the electronic communication to the another one of the set of recipient users.

4. The computer-implemented method of claim 3, wherein sending the electronic communication to the another one of the set of recipient users comprises:

sending the electronic communication to the another one of the set of recipient users concurrently with sending the electronic communication to the at least one of the set of recipient users.

5. The computer-implemented method of claim 1, wherein determining that the at least one of the set of recipient users is not registered to receive electronic communications having the designation comprises:

accessing a user register that stores a set of authorizations for the set of recipient users; and determining, from the set of authorizations included in the user register, that the at least one of the set of recipient users is not registered to receive electronic communications having the designation.

6. The computer-implemented method of claim 1, wherein sending the electronic communication to the at least one of the set of recipient users comprises:

sending the electronic communication to a receiver client associated with the at least one of the set of recipient users.

7. An electronic communication server for managing electronic communications, comprising:

a transceiver configured to communicate via at least one network connection;

a memory configured to store non-transitory computer executable instructions; and a processor configured to interface with the transceiver and the memory, wherein the processor is configured to execute the non-transitory computer executable instructions to cause the processor to:

receive, from a sending client separate from the electronic communication server via the transceiver, an electronic communication of a particular type (i) originated by a sending user of the sending client, (ii) specifying a set of recipient users, and (iii) having a designation, determine that at least one of the set of recipient users is not registered to receive electronic communications having the designation, prior to sending the electronic communication to the at least one of the set of recipient users, send, to the sending client via the transceiver, an additional electronic communication of the particular type, the additional electronic communication indicating that the at least one of the set of recipient users is not registered to receive electronic communications having the designation, wherein the sending client prompts the sending user for approval to send the electronic communication to the at least one of the set of recipient users, receive, from the sending client via the transceiver, an approval to send the electronic communication to the at least one of the set of recipient users, in response to receiving the approval to send the electronic communication, send, via the transceiver, the electronic communication to the at least one of the set of recipient users, the electronic communication sent to the at least one of the set of recipient users indicating that the electronic communication that originated by the sending user originally had the designation, and store the electronic communication in memory to reflect the designation.

8. The electronic communication server of claim 7, wherein the processor is configured to execute the non-transitory computer executable instructions to further cause the processor to:

update, in the memory, a log associated with the electronic communication to reflect that the electronic communication was sent to the at least one of the set of recipient users.

9. The electronic communication server of claim 7, wherein the processor is configured to execute the non-transitory computer executable instructions to further cause the processor to:

determine that another one of the set of recipient users is registered to receive electronic communications having the designation, and send, via the transceiver, the electronic communication to the another one of the set of recipient users.

10. The electronic communication server of claim 9, wherein the processor sends, via the transceiver, the electronic communication to the another one of the set of recipient users concurrently with sending the electronic communication to the at least one of the set of recipient users.

11. The electronic communication server of claim 7, wherein to determine that the at least one of the set of recipient users is not registered to receive electronic communications having the designation, the processor is configured to:
  access a user register that stores a set of authorizations for the set of recipient users, and
  determine, from the set of authorizations included in the user register, that the at least one of the set of recipient users is not registered to receive electronic communications having the designation.

12. The electronic communication server of claim 7, wherein to send the electronic communication to the at least one of the set of recipient users, the processor is configured to:
  send the electronic communication to a receiver client associated with the at least one of the set of recipient users.

13. A non-transitory computer-readable medium, comprising:
  a plurality of instructions which, when executed by one or more processors of an electronic communication server, cause the one or more processors to:
    receive, from a sending client separate from the electronic communication server, an electronic communication of a particular type (i) originated by a sending user of the sending client, (ii) specifying a set of recipient users, and (iii) having a designation,
    determine that at least one of the set of recipient users is not registered to receive electronic communications having the designation,
    prior to sending the electronic communication to the at least one of the set of recipient users, send, to the sending client, an additional electronic communication of the particular type, the additional electronic communication indicating that the at least one of the set of recipient users is not registered to receive electronic communications having the designation, wherein the sending client prompts the sending user for approval to send the electronic communication to the at least one of the set of recipient users,
    receive, from the sending client, an approval to send the electronic communication to the at least one of the set of recipient users,
    in response to receiving the approval to send the electronic communication, send the electronic communication to the at least one of the set of recipient users, the electronic communication sent to the at least one of the set of recipient users indicating that the electronic communication that originated by the sending user originally had the designation, and
    store the electronic communication in memory to reflect the designation.

14. The non-transitory computer-readable medium of claim 13, where the plurality of instructions which, when executed by the one or more processors, further cause the one or more processors to:
  update, in the memory, a log associated with the electronic communication to reflect that the electronic communication was sent to the at least one of the set of recipient users.

15. The non-transitory computer-readable medium of claim 13, where the plurality of instructions which, when executed by the one or more processors, further cause the one or more processors to:
  determine that another one of the set of recipient users is registered to receive electronic communications having the designation, and
  send the electronic communication to the another one of the set of recipient users.

16. The non-transitory computer-readable medium of claim 13, where one or more instructions, of the plurality of instructions, to determine that the at least one of the set of recipient users is not registered to receive electronic communications having the designation cause the one or more processors to:
  access a user register that stores a set of authorizations for the set of recipient users, and
  determine, from the set of authorizations included in the user register, that the at least one of the set of recipient users is not registered to receive electronic communications having the designation.

17. The non-transitory computer-readable medium of claim 13, where one or more instructions, of the plurality of instructions, to send the electronic communication to the at least one of the set of recipient users cause the one or more processors to:
  sending the electronic communication to a receiver client associated with the at least one of the set of recipient users.

* * * * *